United States Patent
Kobayashi et al.

(10) Patent No.: US 6,711,353 B2
(45) Date of Patent: Mar. 23, 2004

(54) PHOTOGRAPHING SYSTEM

(75) Inventors: Kiyotaka Kobayashi, Saitama-ken (JP); Seimei Ushiro, Saitama-ken (JP); Yoshihiro Ito, Saitama-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/359,196

(22) Filed: Feb. 6, 2003

(65) Prior Publication Data

US 2003/0152379 A1 Aug. 14, 2003

(30) Foreign Application Priority Data

| | | | |
|---|---|---|---|
| Feb. 12, 2002 | (JP) | ... | 2002-033905 |
| Feb. 12, 2002 | (JP) | ... | 2002-033906 |
| Nov. 29, 2002 | (JP) | ... | 2002-347692 |

(51) Int. Cl.[7] ............... G03B 7/24
(52) U.S. Cl. ............... 396/207; 396/311; 348/362
(58) Field of Search ........... 396/207, 208, 396/210, 226, 310, 311; 348/207.99, 229.1, 362

(56) References Cited

U.S. PATENT DOCUMENTS

| | | | | |
|---|---|---|---|---|
| 4,309,089 A | * | 1/1982 | Harvey | 396/208 |
| 4,652,102 A | * | 3/1987 | Ogawa et al. | 396/207 |
| 5,389,983 A | * | 2/1995 | Tsunefuji | 396/208 |
| 5,561,484 A | * | 10/1996 | Fant et al. | 396/60 |
| 5,920,736 A | * | 7/1999 | Brogden et al. | 396/210 |
| 5,929,974 A | * | 7/1999 | Inuiya | 355/32 |
| 6,304,730 B1 | * | 10/2001 | Fant et al. | 396/311 |

FOREIGN PATENT DOCUMENTS

JP    9-80695 A    3/1997

* cited by examiner

*Primary Examiner*—W. B. Perkey
(74) *Attorney, Agent, or Firm*—Sughrue Mion, PLLC

(57) ABSTRACT

In the present invention, by using a light-responsive component which can be used in photographing with a sensitivity thereof set to a sensitivity different from an indicated sensitivity, sensitivity information recorded at the light-responsive component by a photographing device can be read at a photo lab, and efficient printing operations can be carried out. While carrying out photographing on a film which can be used in photographing with a sensitivity thereof set to a sensitivity different from the indicated sensitivity in a camera, sensitivity information showing a set sensitivity at a time of photographing is recorded on the film. The film is developed at a photo lab, and the sensitivity information is read by a scanner component of an inputting machine. Printing is carried out by an outputting machine in accordance with the sensitivity information, and the sensitivity information is reflected in printed results.

46 Claims, 22 Drawing Sheets

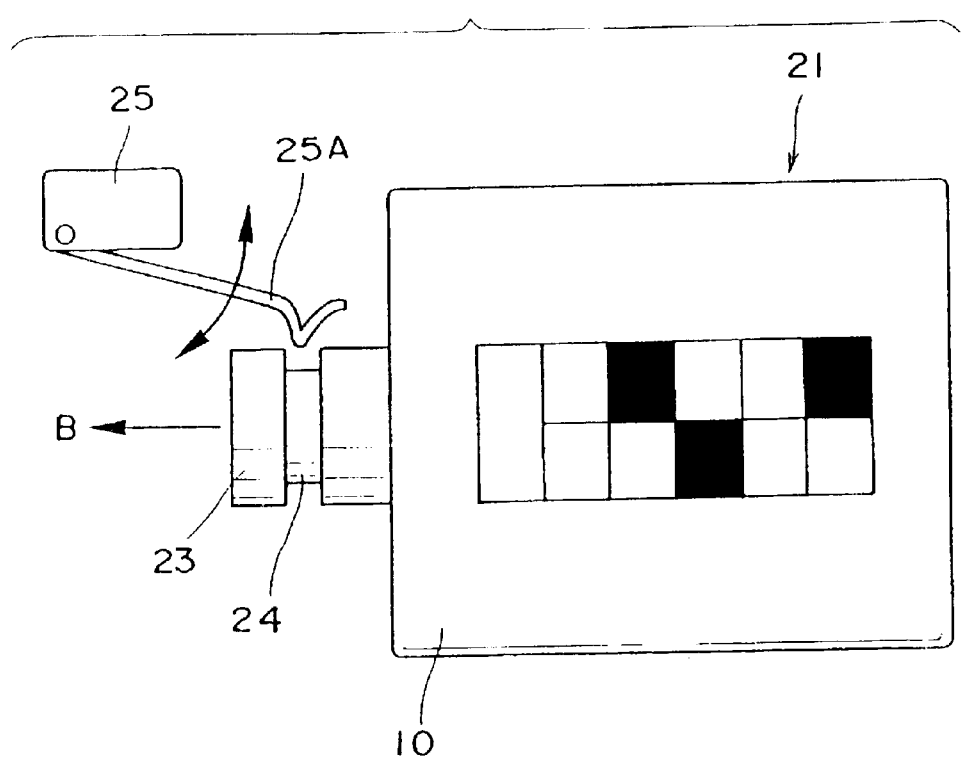

F I G. 12
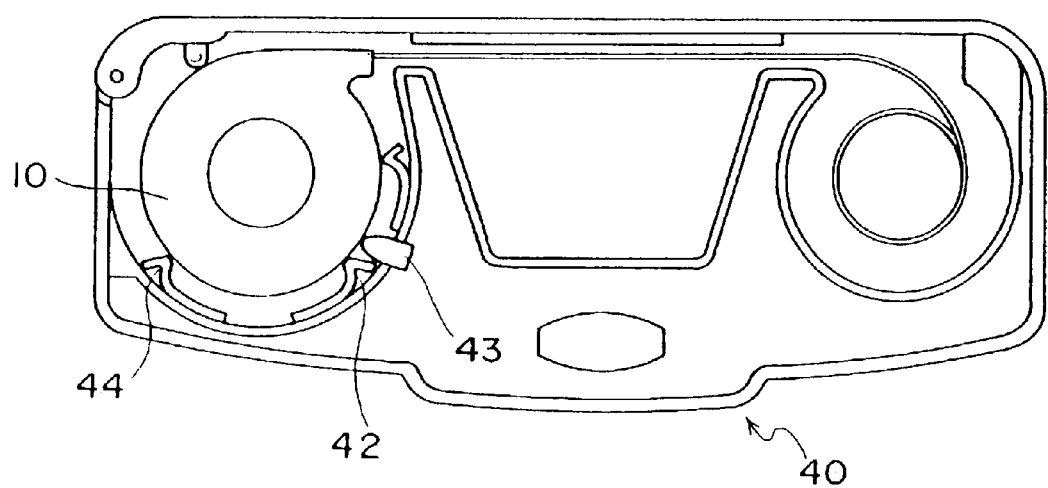

PHOTOGRAPHING SYSTEM

BACKGROUND OF THE INVENTION

1. Field of the Invention

The present invention relates to a photographing device, a film accommodating body, a film system, a photo lab apparatus, a photographing method by the photographing device, and an image processing method by the photo lab apparatus.

2. Description of the Related Art

Conventionally, in photographing using a high sensitivity film, there is the tendency for an image to easily be overexposed. As a result, because the negative density is high, and printing takes much time at a photo lab or a DPE shop, which is problematic.

The negative density can be calculated from the exposure amount at the time of photographing. However, under the present circumstances the negative density is not known until the film is developed at a photo lab or a DPE shop and passed through a printer or a scanner. There is no way for the photo lab to handle such situation.

Further, at recent small photo labs using a film scanner in place of an optical printer, processing such as changing the tone at the time of printing, trimming by electronic zooming, and the like are possible. However, it is hard for a photographer to give instructions for each frame to the photo lab at the time of requesting development. In practice, because the photographer has to reprint images after receiving the finished prints, it is wasteful in terms of costs and time, and is inefficient.

On the other hand, if the sensitivity is set to be high at the camera in order to avoid overexposure, the object which is the main object such as the face of a person or the like becomes dark due to backlighting, and the balance with brightness around the main object is lost.

Alternatively, in the case of indoor photographing, photographing with a night view as the background, or the like, if an electronic flash is used, the modulated light amount of the electronic flash and the exposure amount of the background are out of balance, and only the object is bright and the background is slightly underexposed. Thus, as a result, the brightness of the object and the background are out of balance.

A method in which these problems are avoided by the photographer himself/herself manually changing the sensitivity setting of the camera has not been realized due to the trouble and the ease of making mistakes at the time of photographing. Among recent electronic cameras, there are cameras in which sensitivity setting cannot be manually carried out.

SUMMARY OF THE INVENTION

The present invention has been achieved in consideration of the above-described circumstances, and an object of the invention is to provide a photographing device and a photographing method characterized by having an identifier detecting component which detects an identifier showing that a light-responsive component can be used in photographing with a sensitivity of the light-responsive component set to a sensitivity different from the indicated sensitivity.

Further, another object of the invention is to provide a photographing device further having a recording component which records sensitivity information showing a sensitivity set at the time of photographing, and to provide a photo lab apparatus and an image processing method which, on the basis of the sensitivity information, process images photographed by the photographing device. Moreover, an object of the invention is to provide a film accommodating body and a film system which can be loaded in the photographing device.

Further, an object of the invention is to obtain appropriate exposure conditions by using the light-responsive component, which can be used in photographing with the sensitivity set to a sensitivity different from an indicated sensitivity, and by automatically switching the sensitivity setting of the photographing device in accordance with photographing conditions.

As a technique relating to the invention, for example, Japanese Patent Application Laid-Open (JP-A) No. 9-80695 discloses a film having a bar code that shows film characteristics including the sensitivity, in order to be able to set the exposure conditions by the camera sensing the bar code.

In order to achieve the above-described objects, a photographing device of a first aspect is characterized by comprising an identifier detecting component which detects an identifier showing that a light-responsive component responsive to light from an object can be used in photographing with a sensitivity different from an indicated sensitivity being set as a sensitivity of the light-responsive component.

Namely, the photographing device is characterized by comprising an identifier detecting component which detects an identifier showing that a light-responsive component responsive to light from an object can be used in photographing with a sensitivity different from an indicated sensitivity being set as a sensitivity of the light-responsive component. Therefore, in accordance with the photographing device, it can be identified whether or not the light-responsive component can be used in photographing with the sensitivity set to a sensitivity different from the indicated sensitivity, in order to inform the user of the sensitivity of the light-responsive component.

In a second aspect, there is the feature that the identifier detecting component of the first aspect comprises a first identifier detecting component which detects the identifier, and a second identifier detecting component which detects an indicated sensitivity identifier showing the indicated sensitivity.

Namely, the identifier detecting component has the first identifier detecting component which detects an identifier, and the second identifier detecting component which detects an indicated sensitivity identifier showing the indicated sensitivity. Therefore, an identifier shown by a position or a shape which is different from that of the indicated sensitivity identifier is detected by the first identifier detecting component, so that it can be identified whether or not the light-responsive component can be used in photographing with the sensitivity set to a sensitivity different from the indicated sensitivity.

In a third aspect, the photographing device of the first aspect may have a luminance detecting component which detects a luminance of the object; a sensitivity setting component which sets a sensitivity on the basis of the luminance of the object detected by the luminance detecting component and the identifier detected by the identifier detecting component; and a photographing component which photographs the object on the basis of the sensitivity set by the sensitivity setting component.

Namely, the photographing device has the luminance detecting component which detects the luminance of the object, the sensitivity setting component which sets a sensitivity on the basis of the luminance of the object detected by the luminance detecting component and the identifier detected by the identifier detecting component, and the photographing component which photographs the object on the basis of the sensitivity set by the sensitivity setting component. Accordingly, for example, by setting the sensitivity of the photographing device to be high in outdoor photographing in the daytime in which it is easily for overexposure to occur, or the like, the exposure amount is reduced, and the negative density can be prevented from becoming high.

In a fourth aspect, there is the feature that the light-responsive component in the photographing device of the first to third aspects has the identifier.

Namely, the light-responsive component has the identifier, and the identifier detecting component of the photographing device detects the identifier of the light-responsive component, so that it can be identified whether or not the light-responsive component can be used in photographing with the sensitivity set to a sensitivity different from the indicated sensitivity.

In a fifth aspect, the light-responsive component in the photographing device of the third or fourth aspect is formed so as to be able to record sensitivity information showing the sensitivity at the time of photographing the object, and a recording component which records sensitivity information showing the sensitivity set by the sensitivity setting component may be further provided at the light-responsive component.

Namely, the light-responsive component is formed so as to be able to record the sensitivity information showing the sensitivity at the time of photographing the object, and the recording component which records the sensitivity information showing the sensitivity set by the sensitivity setting component is further provided at the light-responsive component. Therefore, the sensitivity information showing the sensitivity at the time of photographing the object can be recorded at the light-responsive component, and can be informed to a photo lab. In accordance therewith, due to the photo lab knowing this sensitivity information before printing, efficient printing operation can be carried out. In addition to the sensitivity information, information such as the negative density, tone correction, electronic zooming, or the like may be recorded at the light-responsive component.

In a sixth aspect, there is the feature that the photographing device of the first to fifth aspects can load therein an accommodating body which accommodates the light-responsive component, and the accommodating body has an identifier.

Namely, the photographing device can load therein, for example, a cartridge which is an accommodating component that accommodates a film serving as the light-responsive component, and the cartridge may have an identifier.

In a seventh aspect, the photographing device of the third aspect can load therein an accommodating body which accommodates the light-responsive component, and the accommodating body is formed so as to be able to record sensitivity information showing a sensitivity at the time of photographing an object, and a recording component which records sensitivity information showing the sensitivity set by the sensitivity setting component may be further provided at the accommodating body.

Namely, the photographing device can load therein, for example, a cartridge which is an accommodating body that accommodates a film serving as the light-responsive component, and the sensitivity information can be recorded at the cartridge The sensitivity information can be used at the time of printing. In addition to the sensitivity information, information such as the negative density, tone correction, electronic zooming, or the like may be recorded on the film or at the film accommodating body. In this case, these information are used at the time of preparing prints.

In an eighth aspect, there is the feature that the accommodating body has the identifier in the photographing device of the seventh aspect.

Namely, due to the accommodating body having the identifier, it can be identified whether or not the light-responsive component which can be accommodated in the accommodating body, for example, a film which can be accommodated in a cartridge, is a film which can be used in photographing with the sensitivity set to a sensitivity different from the indicated sensitivity.

In a ninth aspect, there is the feature that the light-responsive component has the identifier in the photographing device of the seventh aspect.

Namely, due to the light-responsive component having the identifier, it can be identified whether or not the light-responsive component can be used in photographing with the sensitivity set to a sensitivity different from the indicated sensitivity.

In a tenth aspect, there is the feature that, in the photographing device of the eighth or ninth aspect, the accommodating body has an indicated sensitivity identifier showing the indicated sensitivity, and the identifier detecting component is structured so as to be able to detect the indicated sensitivity identifier.

Namely, because the accommodating body has the indicated sensitivity identifier showing the indicated sensitivity, the light-responsive component which can be accommodated into the accommodating body is handled as a usual light-responsive component having the indicated sensitivity, and the object can be photographed.

In an eleventh aspect, there is the feature that, in the photographing device of the eighth or ninth aspect, the light-responsive component has an indicated sensitivity identifier showing the indicated sensitivity, and the identifier detecting component is structured so as to be able to detect the indicated sensitivity identifier.

Namely, because the light-responsive component has the indicated sensitivity identifier showing the indicated sensitivity, the light-responsive component is handled as a usual light-responsive component having the indicated sensitivity, and the object can be photographed.

In a twelfth aspect, there is the feature that the identifier detecting component of the photographing device of the tenth or eleventh aspect comprises a first identifier detecting component which detects the identifier, and a second identifier detecting component which detects the indicated sensitivity identifier.

Namely, the identifier detecting component has the first identifier detecting component which detects an identifier and the second identifier detecting component which detects an indicated sensitivity identifier showing the indicated sensitivity. Therefore, an identifier shown by a position or a shape which is different from that of the indicated sensitivity identifier is detected by the first identifier detecting component, so that it can be identified whether or not the light-responsive component can be used in photographing with the sensitivity set to a sensitivity different from the indicated sensitivity.

In a thirteenth aspect, there is the feature that a sensitivity characteristic of the light-responsive component in the photographing devices of the third to twelfth aspects has a first region having a first characteristic that approximates a sensitivity characteristic of a light-responsive component having the different sensitivity, and a second region having a second characteristic that approximates a sensitivity characteristic of a light-responsive component having the indicated sensitivity, and the sensitivity setting component sets the sensitivity to one of the different sensitivity and the indicated sensitivity on the basis of the luminance of the object detected by the luminance detecting component.

Namely, the sensitivity characteristic of the light-responsive component has a first region having a first characteristic that approximates a sensitivity characteristic of a light-responsive component having the different sensitivity, and a second region having a second characteristic that approximates a sensitivity characteristic of a light-responsive component having the indicated sensitivity. Due to the sensitivity setting component setting the sensitivity to one of the different sensitivity and the indicated sensitivity on the basis of the luminance of the object detected by the luminance detecting component, for example, one of the different sensitivity and the indicated sensitivity is set in accordance with a case of photographing under scenes having a given luminance or more such as in the daytime/open-air or the like, or a case of photographing in backlight scenes, or a case of photographing in scenes of electronic flash photographing such as a night view or dark interior, or the like. Accordingly, the exposure amount is reduced in open-air photographing in the daytime in which overexposure is likely to occur, or the like, and the negative density can be prevented from becoming high.

In a fourteenth aspect, the light-responsive component in the photographing device of the thirteenth aspect may be a film, and the first region may be a region in which an amount of exposure with respect to the film is less than a predetermined value, and the second region maybe a region in which the exposure amount is larger than the predetermined value, and the indicated sensitivity may be ISO 800, and the different sensitivity may be ISO 1600.

Namely, the light-responsive component in the photographing device is a film, and the first region is a region in which the amount of exposure with respect to the film is less than a predetermined value, and the second region is a region in which the exposure amount is larger than the predetermined value, and the indicated sensitivity is ISO (International Organization for Standardization) 800, and the different sensitivity is ISO 1600. Therefore, for example, the sensitivity of a silver salt camera which is the photographing device can be set to, for example, ISO 1600 in a case of photographing in scenes having a given luminance or more such as in the daytime and the open-air or the like, and can be set to, for example, ISO 800 in a case of photographing in a backlight the scene, and moreover, can be set to, for example, ISO 1600, in a case of photographing in a scene of electronic flash photographing such as a night view, a dark interior, or the like. Accordingly, the exposure amount is reduced in open-air photographing in the daytime or the like in which overexposure is likely to occur, and the negative density can be prevented from becoming high.

A fifteenth aspect has the feature that, in the photographing device of the first to thirteenth aspects, the light-responsive component is an image pickup element which picks up the object.

Namely, the photographing device may be a digital camera in which the light-responsive component is an image pickup element.

A film accommodating body of a sixteenth aspect is a film accommodating body capable of accommodating therein a film which can be used in photographing with the sensitivity set to a sensitivity different from an indicated sensitivity, characterized in that an identifier which identifies that the film can be used in photographing with the sensitivity of the film set to a sensitivity different from the indicated sensitivity, is provided at the film accommodating body.

Namely, by providing an identifier which identifies that the film, which can be accommodated in the film accommodating body, can be used in photographing with the sensitivity set to a sensitivity different from the indicated sensitivity, it can be identified whether or not the film can be used in photographing with the sensitivity set to a sensitivity different from the indicated sensitivity, in order to inform the user of the sensitivity of the light-responsive component.

In a seventeenth aspect, the identifier of the film accommodating body of the sixteenth aspect is a CAS (Camera Auto Sensing) code in which one portion of or all of a continuity surface has a same color as a non-continuity surface, and may be detected as different information by electrical detection and optical detection.

Namely, because the continuity surface of the CAS code, which is usually a metallic silver color, is made to be black which is the same color as the non-continuity surface, in a CAS code detecting method by a usual electric contact, the same results as a film accommodating body in which a usual film can be accommodated are obtained, and on the other hand, different results can be obtained by an optical detecting method by the reflectance. Therefore, a conventional photographing device having only an electrical detecting component identifies the film which can be accommodated in the film accommodating body as a usual film having the indicated sensitivity, and a photographing device having both of the electrical and optical components can identify the film as a film which can be used in photographing with the sensitivity set to a sensitivity different from the indicated sensitivity.

In an eighteenth aspect, the identifier of the film accommodating body of the sixteenth aspect may be a CAS code recorded at a location other than a designated position.

Namely, for example, an additional code is recorded at a location other than a CAS code designated position on the cartridge serving as the film accommodating body and the additional code is read by the photographing device, so that it can be identified that the film which can be accommodated in the film accommodating body is a film which can be used in photographing with the sensitivity set to a sensitivity different from the indicated sensitivity. In the conventional photographing device reading only the CAS code, because there is no function reading the additional code, the film is identified as a usual film as having the indicated sensitivity.

In a nineteenth aspect, the identifier of the film accommodating body of the sixteenth aspect may be a CAS code recorded at gaps between CAS patterns.

Namely, an additional code is recorded at the gaps between the CAS patterns and the additional code is read by the photographing device, so that it can be identified that the film which can be accommodated in the film accommodating body is a film which can be used in photographing with the sensitivity set to a sensitivity different from the indicated sensitivity. In the conventional photographing device reading only the CAS code, because the gaps between the CAS patterns are not reading position, there is no function reading the additional code, and the film is identified as a usual film having the indicated sensitivity.

In a twentieth aspect, in a film accommodating body of the sixteenth aspect, a radio wave sensing IC is provided at the film accommodating body, and the radio wave sensing IC may include the identifier.

Namely, a radio wave sensing IC tag is provided at the film accommodating body, and therefore, it can be identified that the film which can be accommodated in the film accommodating body is a film which can be used in photographing with the sensitivity set to a sensitivity different from the indicated sensitivity. Because the radio wave sensing IC tag cannot be detected by the conventional photographing device, the film is identified as a usual film having the indicated sensitivity.

In a twenty-first aspect, the identifier of a film accommodating body of the sixteenth aspect may be a bar code printed at the film accommodating body.

Namely, the bar code is printed at the film accommodating body, and therefore, it can be identified that the film which can be accommodated in the film accommodating body is a film which can be used in photographing with the sensitivity set to a sensitivity different from the indicated sensitivity. Because the bar code cannot be detected by the conventional photographing device, the film is identified as a usual film having the indicated sensitivity.

In a twenty-second aspect, a film accommodating body of the sixteenth aspect may have a predetermined shape as the identifier.

Namely, the film accommodating body has a predetermined shape as the identifier. By detecting the difference between the predetermined shape and the shape of the conventional film accommodating body by a micro-switch or the like which is a detecting component of the photographing device, it can be identified that the film which can be accommodated in the film accommodating body is a film which can be used in photographing with the sensitivity set to a sensitivity different from the indicated sensitivity. Because the difference in the shapes cannot be detected by the conventional photographing device, the film is identified as a usual film having the indicated sensitivity.

In a twenty-third aspect, a sensitivity characteristic of a film which can be accommodated in the film accommodating body of the sixteenth to twenty-second aspects may have a first region having a first characteristic that approximates a sensitivity characteristic of a film having a different sensitivity, and a second region having a second characteristic that approximates a sensitivity characteristic of a light-responsive component having an indicated sensitivity.

Namely, the sensitivity characteristic of the film has the first region having the first characteristic that approximates a sensitivity characteristic of a light-responsive component having different sensitivity and the second region having the second characteristic that approximates a sensitivity characteristic of a light-responsive component having an indicated sensitivity. Therefore, for example, the sensitivity can be set to one of the different sensitivity and the indicated sensitivity in accordance with, for example, a case of photographing in scenes having a given luminance or more such as in the daytime/open-air or the like, a case of photographing in backlight scenes, a case of photographing in scenes of electronic flash photographing such as a night view or a dark interior, or the like. In accordance therewith, the exposure amount in outdoor photographing in the daytime in which overexposure is likely to occur, or the like is reduced, and the negative density can be prevented from becoming high.

In a twenty-fourth aspect, the film accommodating body of the sixteenth to twenty-third aspects may be formed so as to be able to record sensitivity information showing the sensitivity at a time of photographing an object.

Namely, the film accommodating body can be formed so as to be able to record sensitivity information showing the sensitivity at the time of photographing an object. Due to the photo lab knowing this sensitivity information before printing, efficient printing operation can be carried out. In addition to the sensitivity information, information such as negative density, tone correction, electronic zooming, or the like may be recorded at the film accommodating body.

A film system of a twenty-fifth aspect is a film system having a film which can be used in photographing with the sensitivity set to a sensitivity different from the indicated sensitivity and a film accommodating body having the film accommodated therein, characterized in that an identifier which identifies that the film can be used in photographing with the sensitivity set to a sensitivity different from the indicated sensitivity, is provided at at least one of the film and the film accommodating body.

Namely, in the file system, there is provided at at least one of the film accommodating body and the film which can be accommodated in the film accommodating body, an identifier which identifies that the film can be used in photographing with the sensitivity set to a sensitivity different from the indicated sensitivity. Therefore, it can be identified whether or not the film can be used in photographing with the sensitivity set to a sensitivity different from the indicated sensitivity, in order to inform the user of the sensitivity of the light-responsive component.

In a twenty-sixth aspect, the identifier in the film system of the twenty-fifth aspect is a CAS code in which one portion of or all of a continuity surface has a same color as a non-continuity surface, and may be detected as different information by electrical detection and optical detection.

Namely, due to the continuity surface of the CAS code, which is usually a metallic silver color, being made to be black which is the same color as the non-continuity surface, in a CAS code detecting method by a usual electric contact, the same results as in a usual film system are obtained, and on the other hand, different results can be obtained in an optical detecting method by the reflectance. Therefore, a conventional photographing device having only an electrical detecting component identifies the film as a usual film having an indicated sensitivity, and a photographing device having both of electrical and optical detecting components can identify the film as a film which can be used in photographing with the sensitivity set to a sensitivity different from the indicated sensitivity.

In a twenty-seventh aspect, in the film system of the twenty-fifth aspect, the identifier may be a CAS code recorded at a location other than a designated position.

Namely, for example, an additional code is recorded at a location other than a CAS code designated position on the cartridge serving as a film accommodating body, and the additional code is read by the photographing device, so that it can be identified that the film can be used in photographing with the sensitivity set to a sensitivity different from the indicated sensitivity. In the conventional photographing device reading only the CAS code, because there is no function reading an additional code, the film is identified as a usual film having the indicated sensitivity.

In a twenty-eighth aspect, in the film system of the twenty-fifth aspect, the identifier may be a CAS code recorded at gaps between CAS patterns.

Namely, an additional code is recorded at the gaps between the CAS patterns, and the additional code is read by the photographing device, so that it can be identified that the film can be used in photographing with the sensitivity set to a sensitivity different from the indicated sensitivity. In the conventional photographing device reading only the CAS code, because the gaps between the CAS patterns are not the reading positions, there is no function reading an additional code, and the film is identified as a usual film having the indicated sensitivity.

In a twenty-ninth aspect, in a film system of the twenty-fifth aspect, a radio wave sensing IC is provided at the film accommodating body, and the radio wave sensing IC may include the identifier.

Namely, a radio wave sensing IC tag is provided at the film accommodating body, so that it can be identified that the film can be used in photographing with the sensitivity set to a sensitivity different from the indicated sensitivity. Because the radio wave sensing IC tag cannot be detected by the conventional photographing device, the film is identified as a usual film having the indicated sensitivity.

In a thirtieth aspect, the identifier may be a bar code printed at the film in the film system of the twenty-fifth aspect.

Namely, the bar code is printed on the film, and therefore, it can be identified that the film can be used in photographing with the sensitivity set to a sensitivity different from the indicated sensitivity. Because the bar code cannot be detected by the conventional photographing device, the film is identified as a usual film having the indicated sensitivity.

In a thirty-first aspect, the identifier may be a notch in the film of the film system of the twenty-fifth aspect.

Namely, due to a notch being formed at a film which can be used in photographing with the sensitivity set to a sensitivity different from the indicated sensitivity, and due to the notch being optically detected, it can be identified that the film is a film which can be used in photographing with the sensitivity set to a sensitivity different from the indicated sensitivity. Because the notch cannot be detected by the conventional photographing device, the film is identified as a usual film having the indicated sensitivity.

In a thirty-second aspect, in the film system of the twenty-fifth aspect, there is a magnetic recordable region at the film, and the identifier may be information recorded on the magnetic recordable region.

Namely, there is the feature that there is a magnetic recordable region at the film which can be used in photographing with the sensitivity set to a sensitivity different from the indicated sensitivity, and it can be identified, by the information recorded on the magnetic recordable region, that the film is a film which can be used in photographing with the sensitivity set to a sensitivity different from the indicated sensitivity. Because the magnetic recorded information cannot be detected by the conventional photographing device, the film is identified as a usual film having the indicated sensitivity.

In a thirty-third aspect, in the film system of the twenty-fifth aspect, the film accommodating body may have a predetermined shape as an identifier.

Namely, the film accommodating body has a predetermined shape as an identifier. By detecting the difference between the predetermined shape and a shape of the conventional film accommodating body by a micro-switch or the like which is a detecting component of the photographing device, it can be identified that the film is a film which can be used in photographing with the sensitivity set to a sensitivity different from the indicated sensitivity. Because the difference in the shapes cannot be detected by the conventional photographing device, the film is identified as a usual film having the indicated sensitivity.

In a thirty-fourth aspect, in the film systems of the twenty-fifth through thirty-third aspects, a sensitivity characteristic of the film may have a first region having a first characteristic that approximates a sensitivity characteristic of a film having the different sensitivity, and a second region having a second characteristic that approximates a sensitivity characteristic of a light-responsive component having the indicated sensitivity.

Namely, the sensitivity characteristic of the film has the first region having the first characteristic that approximates a sensitivity characteristic of a light-responsive component having the different sensitivity and the second region having the second characteristic that approximates a sensitivity characteristic of a light-responsive component having the indicated sensitivity. Therefore, one of the different sensitivity and the indicated sensitivity is set in accordance with, for example, a case of photographing scenes having a given luminance or more such as in the daytime/open-air or the like, a case of photographing backlight scenes, a case of photographing scenes of electronic flash photographing such as a night view or a dark interior, or the like. In accordance therewith, the exposure amount in outdoor photographing in the daytime in which overexposure is likely to occur, or the like is reduced, and the negative density can be prevented from becoming high.

In a thirty-fifth aspect, in the film systems of the twenty-fifth to the thirty-fourth aspects, at least one of the film and the film accommodating body may be formed so as to be able to record sensitivity information showing sensitivity at a time of photographing an object.

Namely, at least one of the film and the film accommodating body is formed so as to be able to record sensitivity information showing the sensitivity at the time of photographing the object. Therefore, due to the photo lab knowing this sensitivity information before printing, efficient printing operation can be carried out. In addition to the sensitivity information, information such as negative density, tone correction, electronic zooming, or the like may be recorded.

A photo lab apparatus of a thirty-sixth aspect reads the sensitivity information recorded at the film accommodating body of the twenty-fourth aspect, and processes images on the basis of the sensitivity information.

Namely, the photo lab apparatus reads the sensitivity information recorded at the film accommodating body, and processes images on the basis of the sensitivity information. Therefore, the sensitivity information, which is recorded at the film accommodating body at the time of photographing and which shows the sensitivity setting of the photographing device, is read, so that prints can be prepared for each frame in accordance with the sensitivity information. In addition to the sensitivity information, information such as negative density, tone correction, electronic zooming, or the like may be recorded at the film or the film accommodating body. In this case, this information is used at the time of preparing prints. For example, when information is recorded in which correction of slight overexposure, in which the negative density becomes on an average high, is carried out on the entire negative film, measures such as increasing the light amount of the exposure lamp of a printer or increasing the output of the laser can be adopted.

A photo lab apparatus of a thirty-seventh aspect reads images and the sensitivity information recorded in the film system of the thirty-fifth aspect, and processes the images on the basis of the sensitivity information.

Namely, the photo lab apparatus reads the images and the sensitivity information recorded in the film system of the thirty-fifth aspect, and processes the images on the basis of the sensitivity information. Therefore, the sensitivity information, which is recorded at the film or the film accommodating body and which shows the sensitivity setting of the photographing device, is read at the time of photographing, and prints can be prepared for each frame in accordance with the sensitivity information. In addition to the sensitivity information, information such as negative density, tone correction, electronic zooming, or the like may be recorded at the film or the film accommodating body. In this case, these information are used at the time of preparing the prints.

A photographing method of a thirty eighth aspect detects an identifier showing that a light-responsive component responsive to light from an object can be used in photographing with a sensitivity set to a sensitivity different from an indicated sensitivity being set as a sensitivity of the light-responsive component.

Namely, the photographing method detects the identifier showing that a light-responsive component responsive to light from an object can be used in photographing with a sensitivity set to a sensitivity different from an indicated sensitivity being set as a sensitivity of the light-responsive component. Therefore, in accordance with this photographing method, it can be identified whether or not the light-responsive component can be used in photographing with the sensitivity set to a sensitivity different from the indicated sensitivity, in order to inform the user of the sensitivity of the light-responsive component.

A photographing method of a thirty-ninth aspect comprises the steps of: determining whether or not a film, on which an object is photographed and an image is recorded, can be used in photographing with a sensitivity set to a sensitivity different from the indicated sensitivity; detecting a luminance of the object; and setting the sensitivity on the basis of the detected luminance of the object when the film is determined to be able to be used in photographing with the sensitivity set to a sensitivity different from the indicated sensitivity.

Namely, the photographing device identifies films which can be used in photographing with the sensitivity set to a sensitivity different from the indicated sensitivity. By switching the sensitivity setting of the photographing device in accordance with the photographing conditions, photographing can be carried out at different sensitivity settings by using the same film in accordance with conditions such as the luminance of the object, the presence/absence of an electronic flash, the time, and the like.

In a fortieth aspect, the photographing method of the thirty-ninth aspect may further have a step of recording the set sensitivity.

Namely, photographing sensitivity can be recorded so as to be able to be referred to at the time of printing.

An image processing method of a forty-first aspect comprises steps of: reading the sensitivity recorded according to the photographing method of the thirty-ninth aspect; and processing images recorded on the film on the basis of the read sensitivity.

Namely, the recorded photographing sensitivity is read, and on the basis thereof, the images recorded on the film are processed, and can be appropriately printed out.

The photographing device of the invention is characterized by having an identifier detecting component which detects an identifier showing that a light-responsive component responsive to light from an object can be used in photographing with to a sensitivity different from an indicated sensitivity being set as a sensitivity of the light-responsive component. Accordingly, it can be identified whether or not the light-responsive component can be used in photographing with the sensitivity set to a sensitivity different from the indicated sensitivity, in order to inform the user of the sensitivity of the light-responsive component.

Further, the invention uses the light-responsive component which can be used in photographing with the sensitivity set to a sensitivity different from the indicated sensitivity, and automatically switches the sensitivity setting of the photographing device in accordance with the photographing conditions, and can obtain optimum exposure conditions.

In the above-described embodiment of the invention, only the condition of the luminance of the object was described. However, as photographing conditions, i.e., conditions of the object, the invention can also correspond to conditions such as the distance of the object, the presence/absence of an electronic flash, macro-photographing, self-portrait, portrait, sports, or the like, or can automatically switch the sensitivity by an algorithm in which these conditions are combined. Further, the invention can be sufficiently adapted to not only the film cameras, but also to systems automatically switching the sensitivity of an image pickup element of a digital camera in accordance with the conditions of the object, and to the communicating of printing conditions from a digital camera to a printer, and the like.

Moreover, in the invention, by using a light-responsive component which can be used in photographing with the sensitivity set to a sensitivity different from the indicated sensitivity, the sensitivity information recorded at the light-responsive component can be read by a photographing device at a photo lab, and efficient printing operations can be carried out.

BRIEF DESCRIPTION OF THE DRAWINGS

FIG. 7 is a side elevational view of the cartridge according to the embodiment of the invention.

FIG. 12 is a sectional view of a camera according to the embodiment of the invention.

DESCRIPTION OF THE PREFERRED EMBODIMENT

Figure 1:
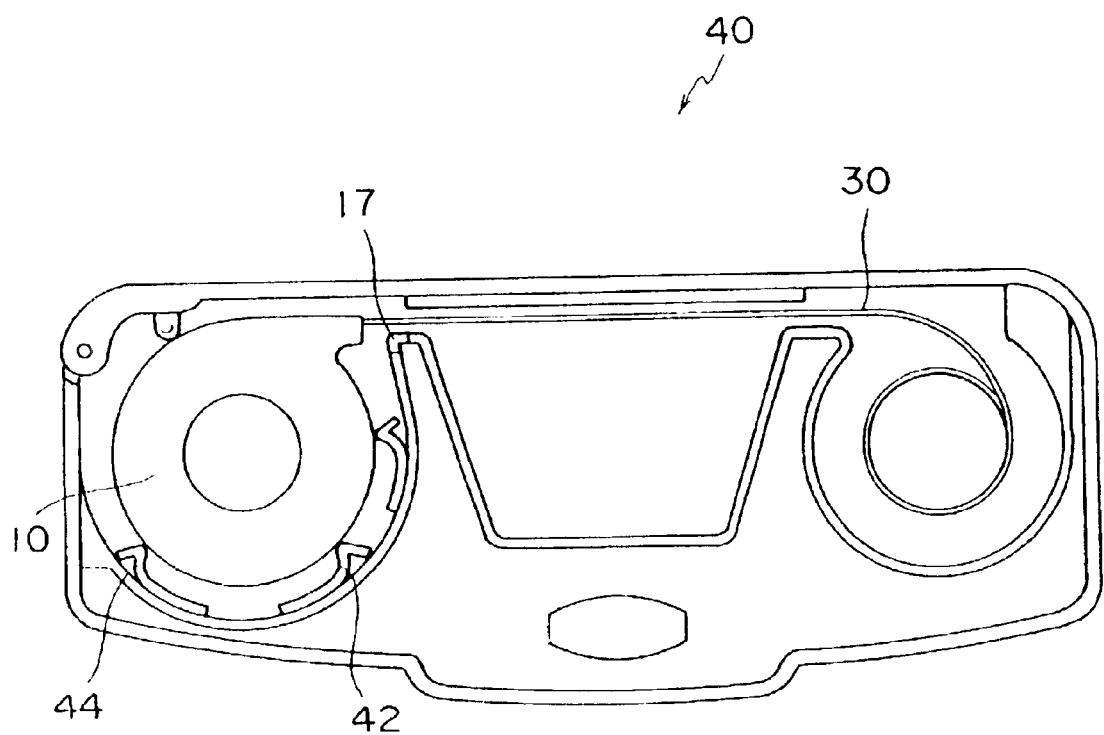
FIG. 1 is a sectional view of a camera according to an embodiment of the invention.

FIG. 1 shows a camera 40 serving as a photographing device according to an embodiment of the invention.

The camera 40 has an LED 17 serving as a recording component which records sensitivity information on a film 30 serving as a light-responsive component, an electrical contact 42 serving as a second identifier detecting component which electrically detects a usual CAS code 102 as an indicated sensitivity identifier, and an electrical contact 44 serving as an identifier detecting component or a first detecting component which detects an additional code 22 serving as an identifier. A cartridge 10 serving as a film accommodating body in which the film 30 is accommodated can be loaded in the camera 40 (refer to FIG. 2 as well).

Figure 16:
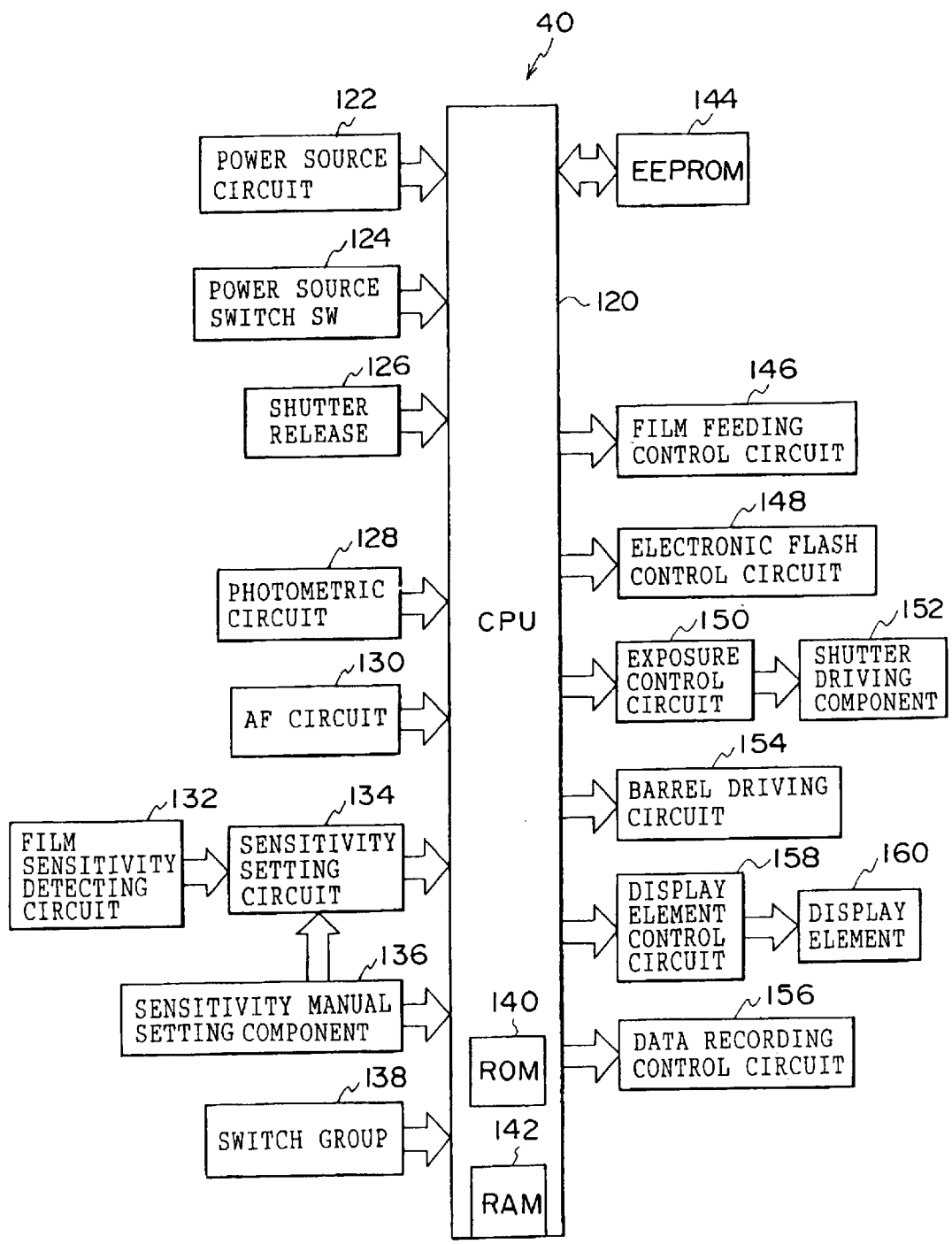
FIG. 16 is a block diagram of the camera according to the embodiment of the invention.

As shown in FIG. 16, the camera 40 has a power source circuit 122 which supplies power to the camera, a power source switch 124 which starts and stops the supply of power to the camera, a shutter releasing button 126 which is depressed for photographing an object, a photometric circuit 128 which carries out photometry of the object, an AF (autofocus) circuit 130 which carries out automatic focal length adjustment, a switch group 138 used for carrying out photographing settings or the like, an EEPROM 144 in which controlling programs are built in, a film feeding control circuit 146 which controls feeding of the film 30, an electronic flash control circuit 148 which controls flashing of an electronic flash, an exposure control circuit 150 which controls exposure and serving as a photographing component, a shutter driving component 152 controlled by the exposure control circuit 150, and a barrel driving circuit 154 which drives a barrel to extend and contract. All of these circuits are connected to a central computing processing unit (CPU) 120, and are controlled by the CPU 120. The CPU 120 includes a ROM 140 which stores a firmware and a RAM 142 which temporarily stores data.

Moreover, the camera 40 has a film sensitivity detecting component 132 including the electrical contact 44 as an identifier detecting component which detects the additional code 22, a sensitivity setting circuit 134 as serving a sensitivity setting component and setting a photographing sensitivity of the camera 40 on the basis of sensitivity information detected by the film sensitivity detecting component 132, or on the basis of output of a sensitivity manual setting component which is manually set, a data recording control circuit 156 which controls the recording when the photographing sensitivity is recorded on the film, a display element 160 such as an LCD or the like, and a display element control circuit 158 which controls the display element 160. These circuits also are connected to the CPU 120, and are controlled by the CPU 120.

As shown in FIG. 1 and FIG. 16, the cartridge 10 in which the film 30 is filled is loaded in the camera 40. The film sensitivity detecting component 132 reads an identifier provided at the cartridge 10 or the film 30, so that the photographing sensitivity setting of the camera is automatically switched by the sensitivity setting circuit 134 in accordance with the photographing condition detected by the photometric circuit 128 serving as a luminance detecting component or the like, for example, the luminance of the object.

Figure 2:
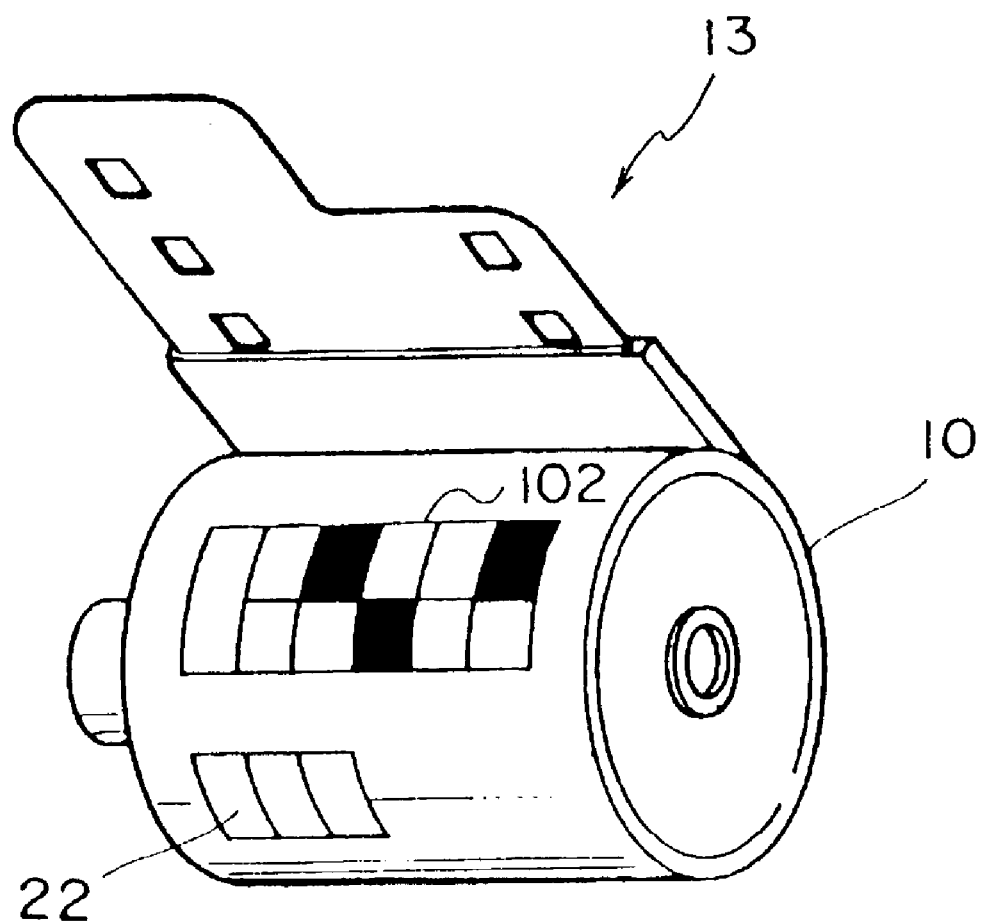
FIG. 2 is a perspective view of a cartridge of a film system according to the embodiment of the invention.

As an example, as shown in FIG. 2, when the cartridge 10, at which the additional code 22 serving as an identifier is recorded at a location other than a designated position of the CAS code, is used, the electrical contact 42 electrically detecting a usual CAS code 102 serving as a display sensitivity identifier is provided, and the electrical contact 44 detecting the additional code 22 is provided at a location corresponding to the position of the additional code 22.

In accordance therewith, usual films and films which can be used in photographing with the sensitivity set to a sensitivity different from an indicated sensitivity (hereinafter, called new films. For example, a film which, although the indicated sensitivity is ISO 800, can be used for photographing with the sensitivity set to a sensitivity of ISO 1600 which is a sensitivity different from the indicated sensitivity) are distinguishably displayed on the display element 160 of the camera 40. The following can be considered as displaying methods, a method of distinguishing by outline characters (usual film) and black characters (new film), a method in which the display of a film sensitivity flickers in the case of the new film, a method in which the ISO sensitivity numeric value portion is underlined, a method in which the ISO sensitivity numeric value portion is framed, or an interruption-displaying method in which, for example, "800" and "1600" are alternately displayed, or the like.

The new film is a film whose sensitivity characteristic has a first region having a first characteristic that approximates the sensitivity characteristic of a film having a different sensitivity, and a second region having a second characteristic that approximates the sensitivity characteristic of a film having the indicated sensitivity. For example, the film may have a first characteristic at a region having a predetermined exposure amount or more, and may have a second characteristic at a region having a predetermined exposure amount or less. On the contrary, the film may have a first characteristic at a region having a predetermined exposure amount or less, and may have a second characteristic at a region having a predetermined exposure amount or more.

Figure 22:
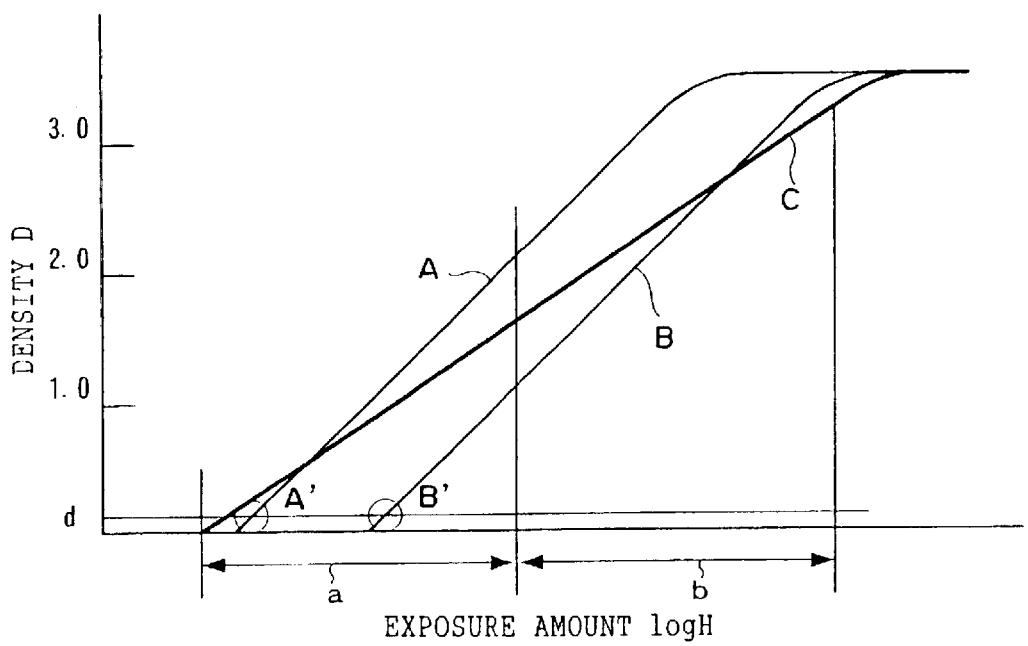
FIG. 22 shows one example of sensitivity characteristics of a new film according to the embodiment of the invention.

For example, the sensitivity characteristic of the new film of the invention is shown by C in the sensitivity characteristic graph of FIG. 22. Here, the sensitivity characteristic of a film having an indicated sensitivity is shown by A, and the sensitivity characteristic of a film having a different sensitivity is shown by B. For example, A may be a sensitivity characteristic of ISO 800, and B may be a sensitivity characteristic of ISO 1600. The indicated sensitivity of the film is defined at sensitivity characteristic portions shown by A' and B' at a predetermined density d. In this case, the film shown by sensitivity characteristic C has a characteristic approximating ISO 800 in region a, and has a characteristic approximating ISO 1600 in region b.

The sensitivity setting circuit 134 sets the sensitivity to one of the indicated sensitivity and the different sensitivity on the basis of the luminance of the object detected by the photometric circuit 128.

By viewing the display element 160, the user operates the sensitivity manual setting component 136, and can manually set the photographing sensitivity of the camera. The photographing sensitivity setting of the camera is switched by the sensitivity setting circuit 134 on the basis of the output of the set sensitivity manual setting component 136.

Further, in the camera 40, while carrying out photographing on the new film 30, at the same time, sensitivity information showing the sensitivity set at the camera at the time of photographing, and printing information such as tone correction, electronic zooming, or the like, are recorded on the film 30 as a bar code by the LED 17 provided in the camera 40. The sensitivity information and the printing information recorded as the bar code are, after film development is carried out at a photo lab, read by a scanner which is an inputting machine, and are reflected in the printed results.

Moreover, here, the sensitivity information and the printing information are optically recorded as the bar code on the new film 30 in the camera 40. However, a magnetic recording layer may be provided on the film 30, and magnetic recording may be carried out by providing a magnetic head as a recording component in the camera 40.

The cartridge 10 of a film system 13 according to the embodiment of the invention is shown in FIG. 2.

As shown in FIG. 2, the additional code 22 is recorded at a location other than the CAS code designated position which is set on the cartridge 10.

Because the additional code 22 is recorded at an area which cannot be detected by the electrical contact 42 provided at a usual camera, the film is recognized as a film having a usual indicated sensitivity. However, in the camera 40 having a detecting component reading the additional code 22, the film can be recognized as the new film 30.

Here, although the additional code 22 is written on a place other than the CAS code designated position, the following other methods can be considered: a method in which a continuity surface of the CAS code is made to be black and optical detection is used, a method in which the additional code is provided at a gap between CAS code patterns, a method in which a shape of a shaft portion is changed and the additional code 22 is physically detected, a method in which a radio wave sensing IC tag is attached to the cartridge, a method in which the additional code is pre-printed as a bar code on the edge portion of the film, a method in which holes (notiches) are provided between perforations and the holes are detected, a method in which a magnetic recording layer is provided on the film and the additional code 22 is recorded thereon, and the like.

Figure 3:
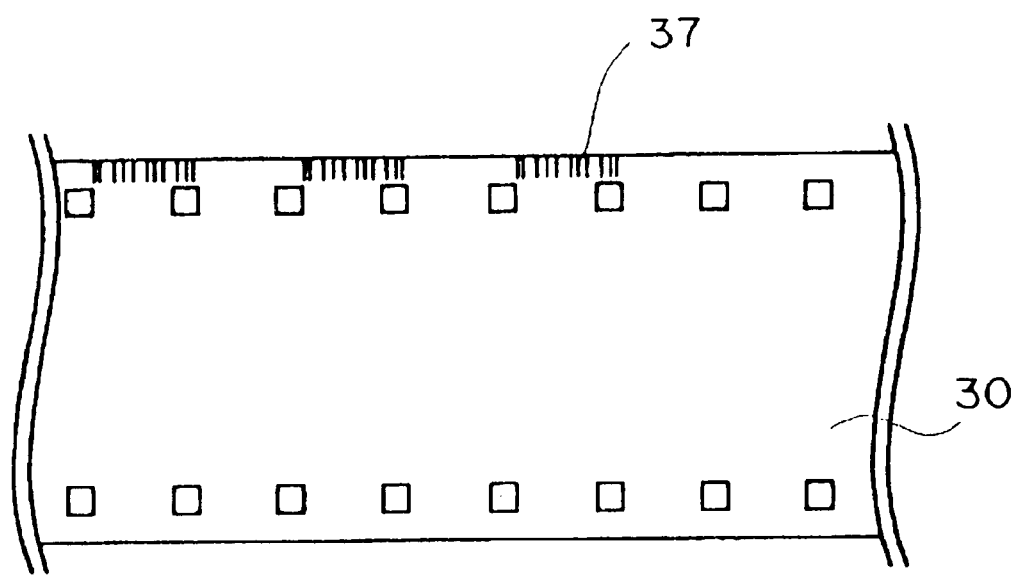
FIG. 3 is an explanatory view of a film according to the embodiment of the invention.

Further, the film 30 of a film system according to the embodiment of the invention is shown in FIG. 3.

As shown in FIG. 3, sensitivity information showing the sensitivity set at the camera at the time of photographing, and printing information such as tone correction, trimming by electronic zooming, or the like, are recorded as a bar code 37 on the edge portion of the new film 30 in the camera 40 at the time of photographing, and are read by a photo lab apparatus. In this way, the sensitivity information and the printing information can be sent from the photographer to the photo lab. The sensitivity information and the printing information are, after the film is developed at a photo lab apparatus, read by a scanner which is an inputting machine, and are reflected on the printed results.

Note that, in the present embodiment, the sensitivity information and the printing information are recorded as a bar code on the edge portion of the film 30. However, the invention is not limited to this, and as will be described later, for example, portions other than the cartridge 10 and the edge of the film 30 may have a magnetic recordable region, and the sensitivity information and the printing information may be magnetic recorded on this magnetic recordable region.

Further, in the above description, description was given of a case of using the cartridge 10 used for the 35 mm film system 13 as the film accommodating body. However, the present embodiment is not limited to this, and for example, a cartridge 201 used for an APS film system 200 shown in FIGS. 17A and 17B, a film pack 221 of an instant film system 220 shown in FIG. 17D, or the like may be used as a film accommodating body.

Figure 17A:
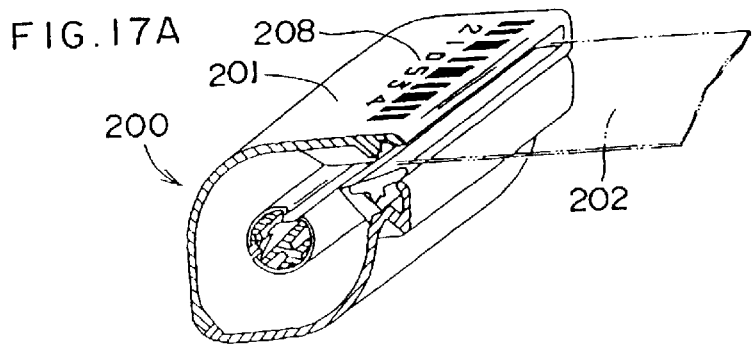
FIG. 17A to FIG. 17D are perspective views of an APS film system, a negative film, and an instant film system according to the embodiment of the invention.
Figure 17B:
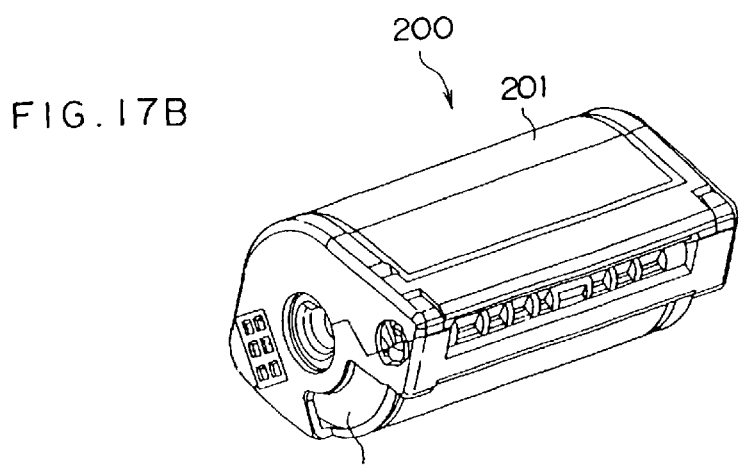
Figure 17C:
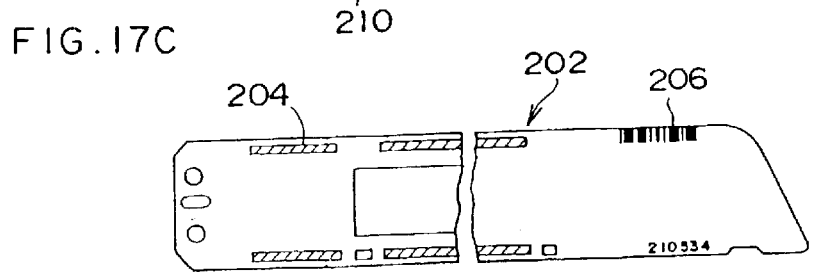
Figure 17D:
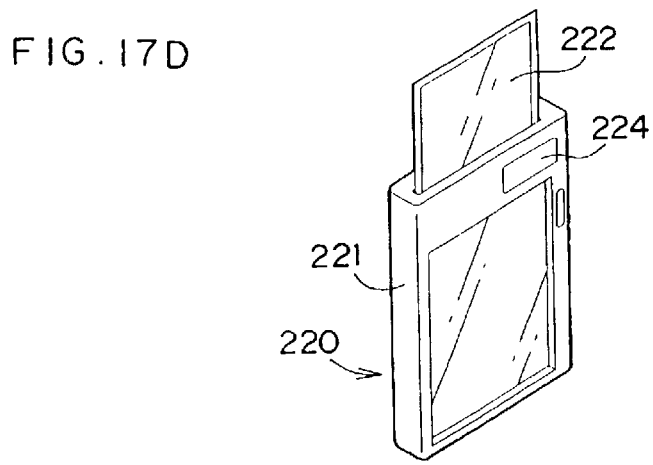

Specifically, the above-described identifier and sensitivity information may be a bar code 208 recorded on the cartridge 201 shown in FIG. 17A, a bar code recorded on a data disk 210 provided at a side end of the cartridge 201 shown in FIG. 17B (refer to FIGS. 18A and 18B as well), magnetic information 204 and a bar code 206 recorded on a negative film 202 shown in FIG. 17C, magnetic information or a bar code 224 at a side face of the film pack 220 shown in FIG. 17D, or the like.

Figure 18A:
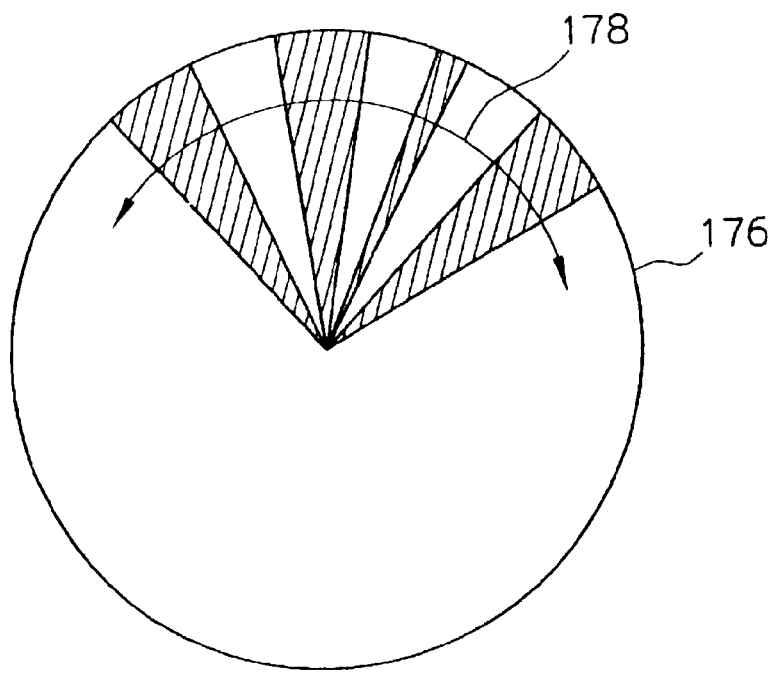
FIG. 18A shows a bar code recorded on a conventional data disk.
Figure 18B:
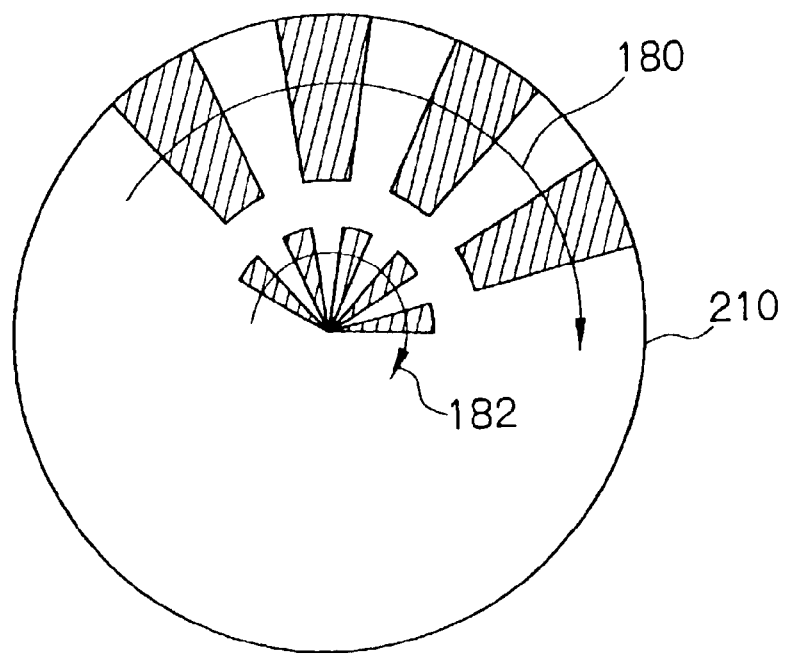
FIG. 18B show bar codes recorded on a data disk according to the embodiment of the invention.

A bar code recorded on a usual data disk 176 is shown in FIG. 18A. The bar code is usually recorded on only one track 178. A case in which the above-described identifier is recorded on a data disk is shown in FIG. 18B. At the data disk 210 shown in FIG. 18B, a usual bar code is recorded on a first track 180, and a bar code which is an identifier is recorded on a second track 182.

Figure 19:
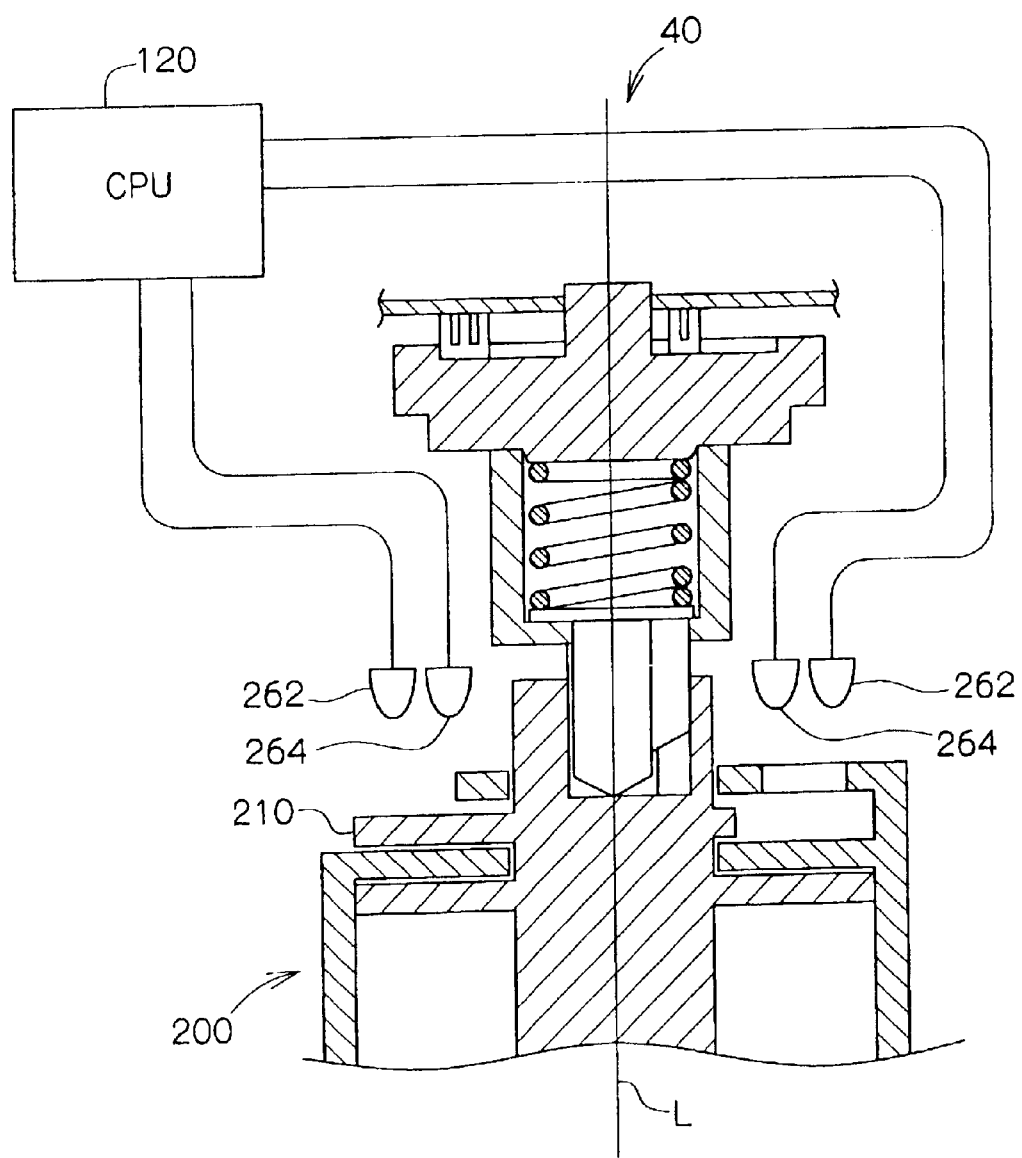
FIG. 19 shows a mechanism reading the bar codes of the data disk according to the embodiment of the invention.

As shown in FIG. 19, the camera 40 which can detect the identifier recorded on the data disk 210 has a sensor 262 which is connected to the CPU 120 and which is for detecting a usual bar code, and a sensor 264 serving as a detecting component for detecting the bar code serving as the identifier. The sensor 264 is disposed so as to be at a position corresponding to the second track 182 of the data disk 210 when the APS film system 200 is loaded at a film system loading component of the camera 40. The sensor 262 is disposed so as to be at a position corresponding to the first track 180 of the data disk 210. The sensors 262 and 264 are photo-reflectors structured from, for example, light-emitting diodes and light-receptive diodes.

When the APS film system 200 having the bar code serving as an identifier is loaded in the camera 40 having the sensor 264 serving as an identifier detecting component, the bar code recorded on the second track 182 is detected by the sensor 264. In accordance therewith, the camera 40 can determine that the loaded APS film system 200 can be used in photographing with the sensitivity set to a sensitivity different from the indicated sensitivity.

Even if the APS film system 200 having the bar code serving as an identifier is loaded in a usual camera which does not have the sensor 264, the bar code recorded on the second track 182 is not detected. Accordingly, the camera can handle the loaded APS film system 200 as a film system having the indicated sensitivity.

In this way, a recording component and an identifier detecting component corresponding to the identifier to be used can be provided at the camera in accordance with the position of the identifier.

Note that the above-described embodiment describes a case in which a silver salt camera serving as a photographing device and a film serving as a light-responsive component are used. However, the invention is not limited to this, and for example, a digital camera may be used as the photographing device and an image pickup element such as a CCD or the like may be used as the light-responsive component.

Further, in the above-described embodiment, the photographing device has been described in which the first identifier detecting component, which detects the identifier, and the second identifier detecting component, which detects the indicated sensitivity identifier showing the indicated sensitivity, are separately provided. However, the invention is not limited to this, and for example, the first identifier detecting component and the second identifier detecting component may be structured as a single identifier detecting component. In this case, the identifier and the indicated sensitivity identifier can be recorded at the same position in the same way, and can be distinguished in accordance with information contained therein.

Figure 4:
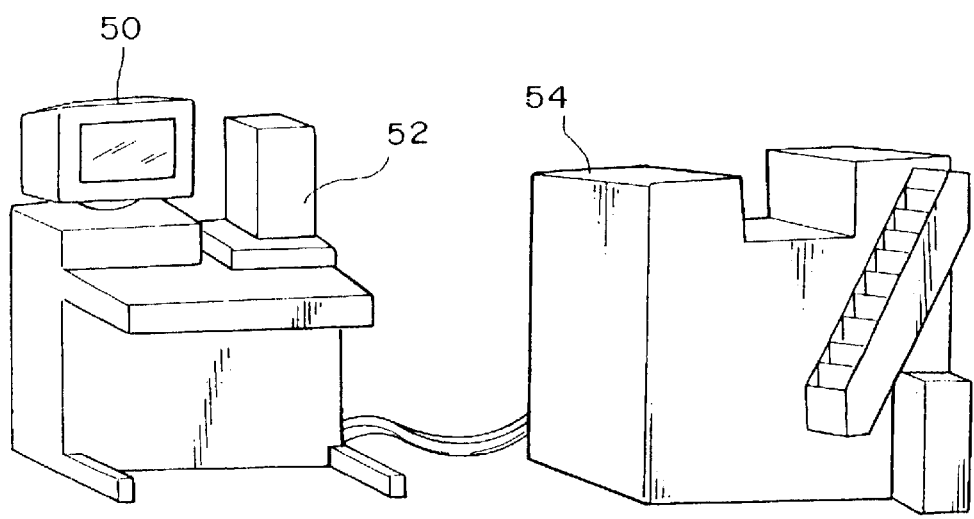
FIG. 4 is a structural view of a photo lab apparatus according to the embodiment of the invention.

A photo lab apparatus according to the embodiment of the invention is shown in FIG. 4.

As shown in FIG. 4, a scanner component 52 is provided at an inputting machine 50. A film is scanned at the scanner component 52, and the film image information is converted into electronic information.

The inputting machine 50 is connected to an outputting machine 54. The film image information converted into the electronic information at the scanner component 52 is exposed on a color paper at the outputting machine 54, and is outputted as a color print.

Figure 20:
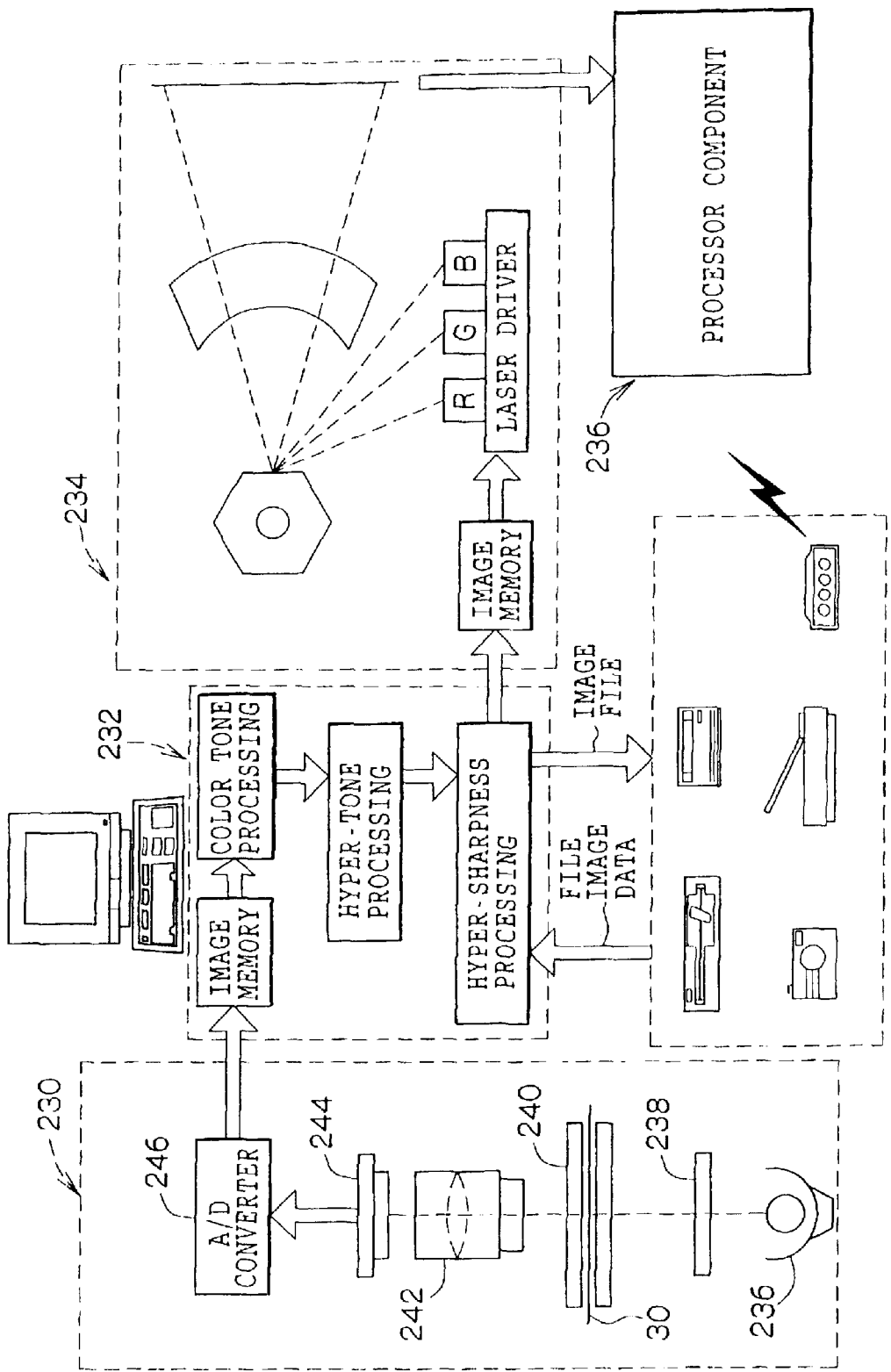
FIG. 20 is a block diagram of the photo lab apparatus according to the embodiment of the invention.

As shown in detail in FIG. 20, the photo lab apparatus includes a line CCD scanner 230 corresponding to the scanner component 52, an image processing component 232 mainly corresponding to the inputting machine 50, a laser printer component 234 corresponding to the outputting machine 54, and a processor component 236. In the line CCD scanner 230, a light source 236 irradiating light on the film 30, a light diffusing plate 238 making the light into diffused light, a film carrier 240 carrying the film 30, a lens unit 242 focusing the light, and a line CCD 244 are disposed in this order. Moreover, the line CCD scanner 230 has an analog/digital (A/D) converter 246.

Figure 21:
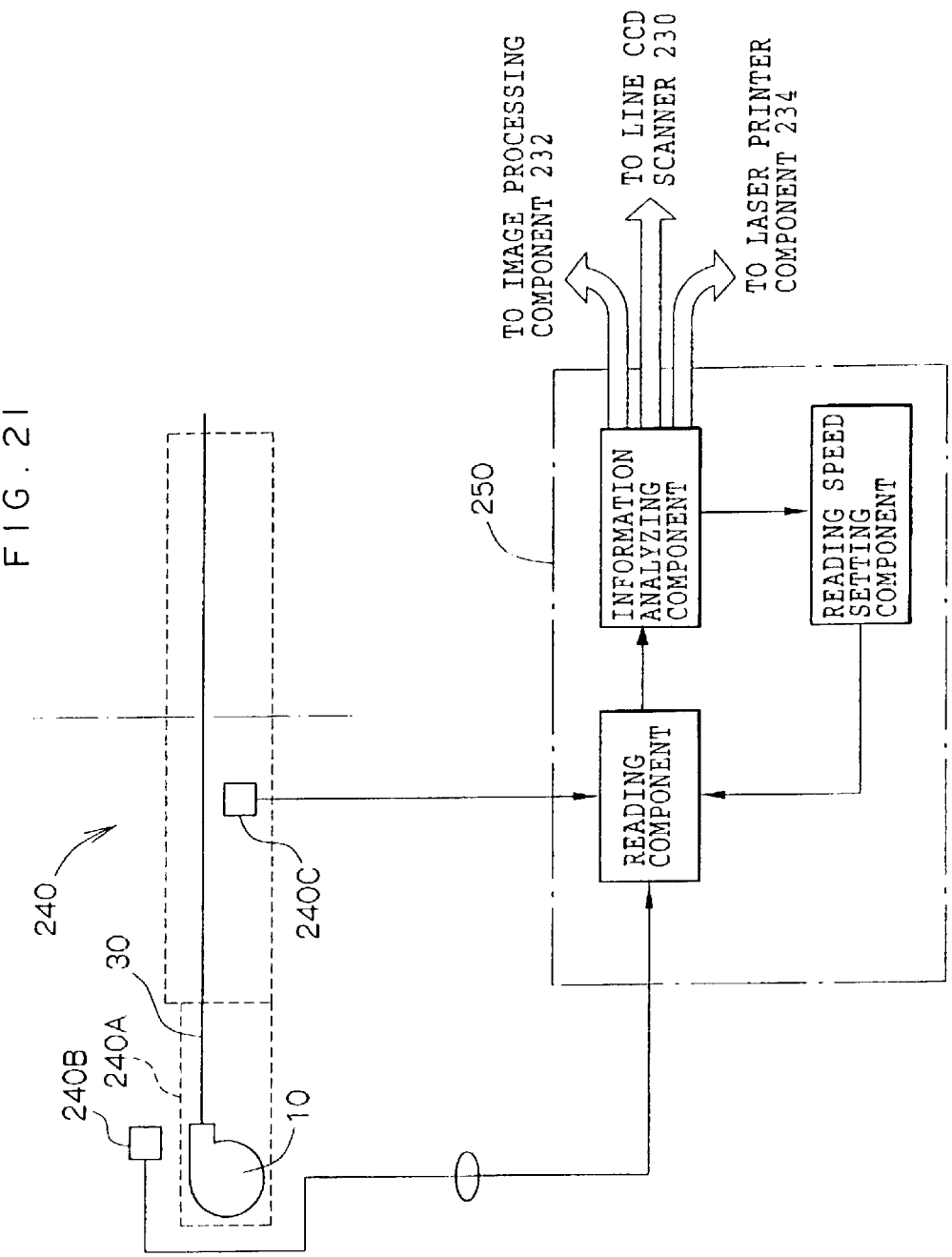
FIG. 21 is a block diagram showing a film system loading component according to the embodiment of the invention.

As shown in FIG. 21, a film system loading component 240A of the film carrier 240 has a bar code reader 240C for detecting the bar code 37 serving as sensitivity information recorded on the film 30, and an information reading device 250 analyzing the output of the bar code reader 240.

Next, the operation of the embodiment will be described. When the film system 13 is loaded at the film system loading component 240A, the film 30 is conveyed by the film carrier 240 such that the image surface of the frame image is perpendicular to the optical axis. The bar code 37 recorded on the film 30 is detected by the bar code reader 240C, and is transmitted to the information reading device 250. The information reading device 250 analyzes the bar code 27, and transmits it to the image processing component 232, the line CCD scanner 230, and the laser printer component 234 as needed.

The line CCD scanner 230 reads the frame image by the line CCD 244. After the frame image is A/D converted at the A/D converter 246, the image data is outputted to the image processing component 232.

In this way, the sensitivity information and the printing information recorded on the film in the camera at the time of photographing, are read simultaneously along with the frame image at the scanner component 52. Printing is carried out at the outputting machine 54 in accordance with printing information such the increase in the light amount of the light source, tone correction, electronic zooming, and the like. As a result, the sensitivity information and the printing information recorded on the film in the camera at the time of photographing, are reflected in the printed results.

Note that, as described above, the sensitivity information is not limited to the bar code 37 recorded on the film 30. For example, the sensitivity information may be the bar code 208 recorded at the cartridge 201 of the APS film system 200, or the like. In this case, as shown in FIG. 21, a bar code reader 240B may be provided at a position corresponding to the bar code 208 of the cartridge 201. In addition to this, a sensor corresponding to the sensitivity information which is used may be provided in the photo lab apparatus in accordance with the recorded place of the sensitivity information.

The line CCD scanner 230 may be for reading frame images recorded on a photographic film such as a negative film, a reversal film, or the like, in addition to the film 30. For example, frame images of a 135-size photographic film, a 110-size photographic film, a photographic film in which a transparent magnetic layer is formed (a 240-size photographic film (APS film)), and 120-size and 220-size photographic films (Brownie size) may be objects of reading.

Figure 5:
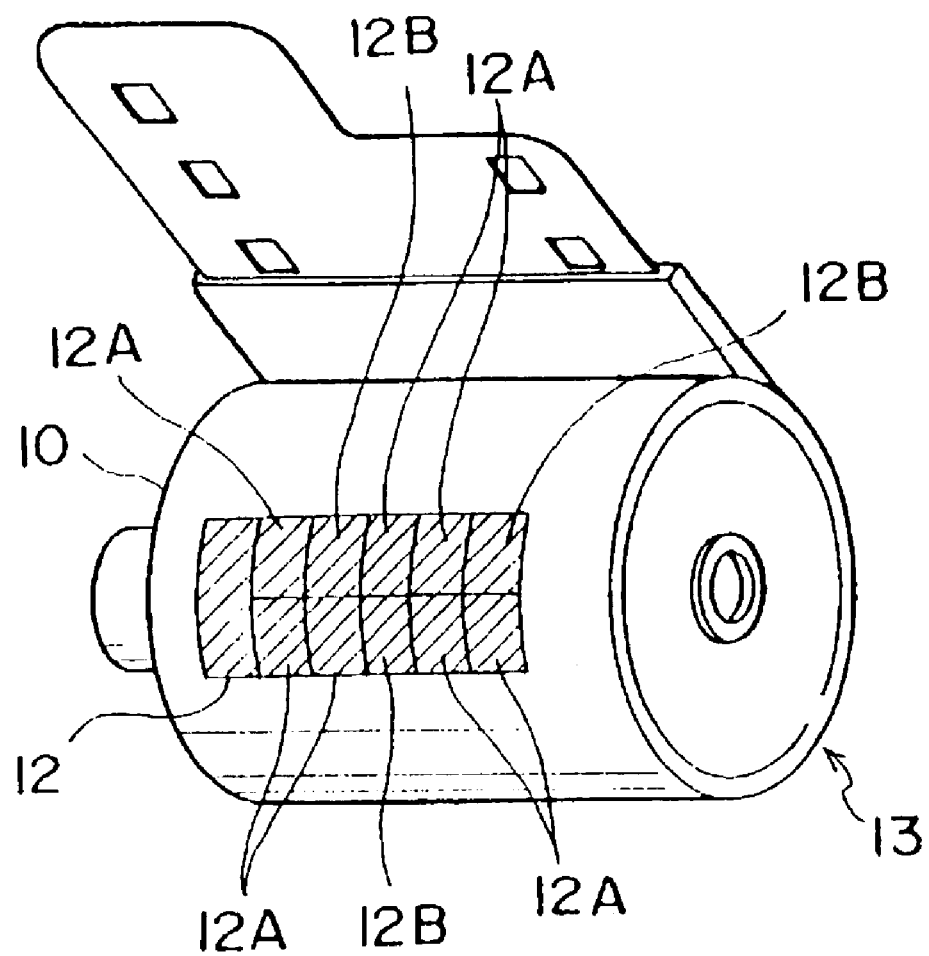
FIG. 5 is a perspective view of the cartridge according to the embodiment of the invention.

The cartridge 10 of the film system 13 according to a first modified example of the embodiment of the invention is shown in FIG. 5. Note that description of parts which are similar to those of the embodiment of the invention will be omitted.

Figure 14:
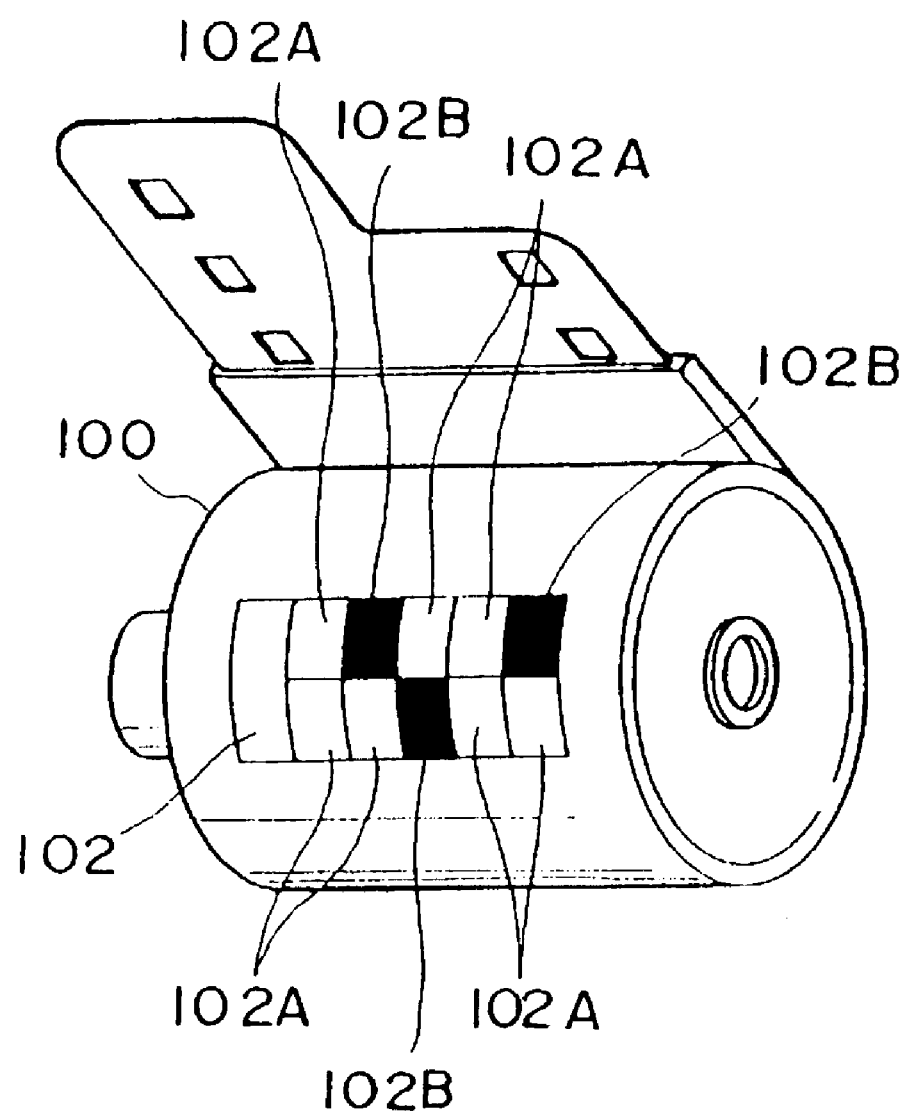
FIG. 14 is a perspective view of a conventional cartridge.

As shown in FIG. 14, the CAS code 102 provided at the side face of a conventional cartridge 100 comprises continuity portions 102A which are metallic silver color and non-continuity portions 102B which are black. As shown in FIG. 5, in a CAS code 12 serving as an identifier provided at the side face of the cartridge 10 serving as a film accommodating body, the color of continuity portions 12A is black in the same way as that of non-continuity portions 12B. (At the conventional CAS code portion 102A provided at the side face of the conventional cartridge 100, it is a metallic silver color.) Although the black continuity portions 12A conduct electricity in the same way as the continuity portions 102A of the conventional CAS code portion 102, the optical property thereof is the same as that of the non-continuity portions 102B of the conventional CAS code portion 102 serving as an indicated sensitivity identifier.

In accordance therewith, in a detecting method by the electrical contact 42 of the camera 40 shown in FIG. 12, the conventional CAS code 102 is detected and the film is recognized as a usual film having the indicated sensitivity. However, at the CAS code 12 of the film system 13, the black color is optically detected by a optical sensor 43 serving as a detecting component, and the electrical contact 42 electrically detects the continuity portions 12A. The film can thereby be recognized as the new film 30 by the camera 40.

Note that, in the embodiment, both of the continuity portions 12A and the non-continuity portions 12B of the CAS code 12 are black. However, the invention is not limited to this, and both can be an arbitrary same color.

Figure 6A:
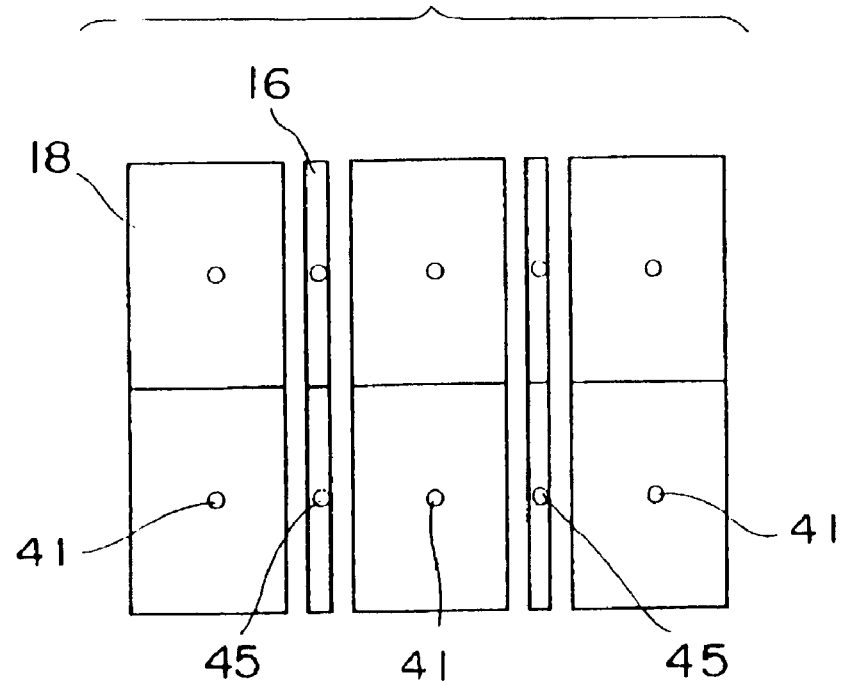
FIG. 6A is a CAS code pattern according to the embodiment of the invention.
Figure 6B:
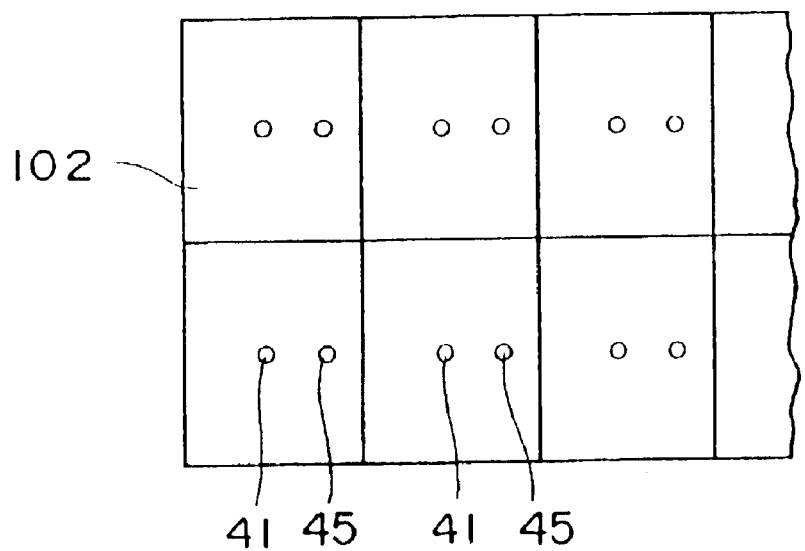
FIG. 6B is a conventional CAS code pattern.

In FIG. 6, a CAS code 18 (FIG. 6A) serving as an identifier applied to the cartridge serving as a film accommodating body of a film system according to a second modified example of the embodiment of the invention, and the conventional CAS code 102 (FIG. 6B) serving as an indicated sensitivity identifier are shown. Note that description of portions which are similar to those of the above-described embodiment of the invention will be omitted.

As shown in FIG. 6B, the conventional CAS code 102 is structured such that CAS code patterns determined at a given dimension are aligned in two rows. However, the electrical contact 42 provided at the camera 40 detects the continuity/non-continuity by contacting the CAS code 102 by using one portion around the center of the code patterns of the CAS code 102, and not by using the peripheral portions of the patterns.

Here, as shown in FIG. 6A, an additional code 16 serving as an identifier is recorded at the peripheral portions of the patterns, i.e., the gaps between the code patterns 18. (It is preferable to avoid the vicinity of the border line between the pattern and the pattern shown in FIG. 6B because it is easy for detecting mistakes to arise.) The film is recognized as a new film by reading the additional code 16 at the camera.

Figure 15:
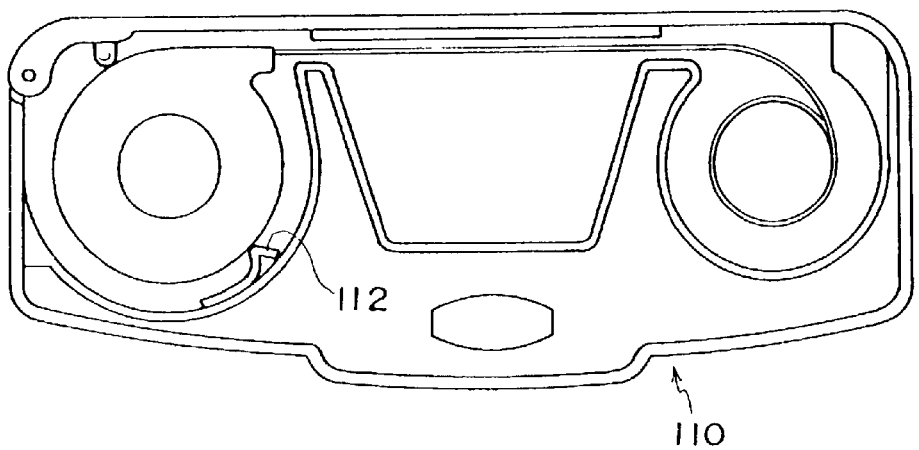
FIG. 15 is a sectional view of a conventional camera.

Note that, because the additional code 16 is at a position at which the electrical contact 112 provided at a usual camera 110 as shown in FIG. 15 cannot read, the film is recognized as a film having the indicated sensitivity by the usual camera.

In FIG. 7, the cartridge 10 serving as a film accommodating body of a film system 21 according to a third modified example of the embodiment of the invention is shown. Note that description of portions which are similar to those of the above-described embodiment of the invention will be omitted.

As shown in FIG. 7, a step 24 serving as an identifier is provided at the entire periphery of a shaft portion 23 of the cartridge 10 which usually has a simple, cylindrical outer shape. When the cartridge 10 is loaded in the direction of arrow B, the shaft portion 23 pushes an actuator 25A of a micro-switch 25. When the cartridge 10 is completely loaded, a free end portion of the actuator 25A enters into the step 24, and the switch is turned on. Accordingly, the film is recognized as a new film 21.

Because the step 24 of the shaft portion 23 cannot be detected by a usual camera which does not have the micro-switch 25, the film is recognized as a film having the indicated sensitivity by a usual camera.

Further, even if a usual cartridge in which the step 24 is not formed at the shaft portion 23 is loaded, because the switch is not turned on, the film is recognized as a film having the indicated sensitivity.

Note that, in the present embodiment, the step 24 is provided at the shaft portion 23 of the cartridge 10. However, the invention is not limited to this. For example, a notch or the like may be provided at an arbitrary place of the cartridge 10. Namely, the cartridge 10 may have an arbitrary shape as an identifier.

Figure 8:
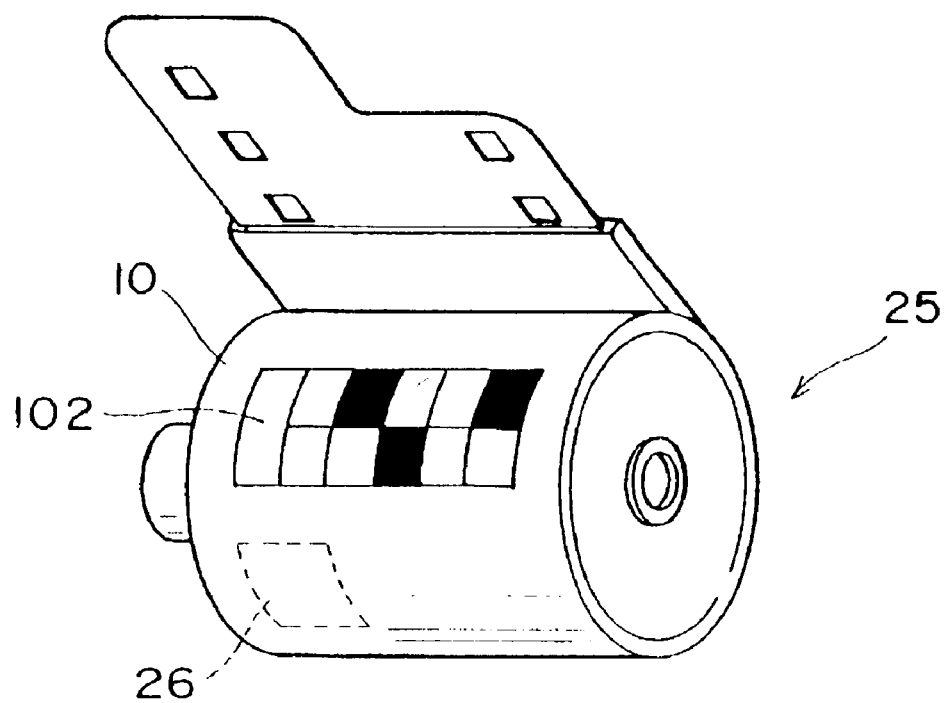
FIG. 8 is a perspective view of the cartridge according to the embodiment of the invention.

In FIG. 8, the cartridge 10 serving as a film accommodating body of a film system 25 according to a fourth modified example of the embodiment of the invention is shown. Note that description of portions which are similar to those of the above-described embodiment of the invention will be omitted.

As shown in FIG. 8, an IC tag 26 serving as an identifier for sensing radio waves is inserted into the cartridge 10 by a printing method, and the film is recognized as a new film by transmitting detection radio waves serving as a detecting component from the camera. Here, although the IC tag 26 is applied to a metal portion of the cartridge 10 by a printing method, the IC tag 26 may be insert-molded in a molded part such as a shaft of the cartridge or the like.

Because the IC tag 26 cannot be detected by a usual camera, the film is recognized as a film having the indicated sensitivity.

Figure 9:
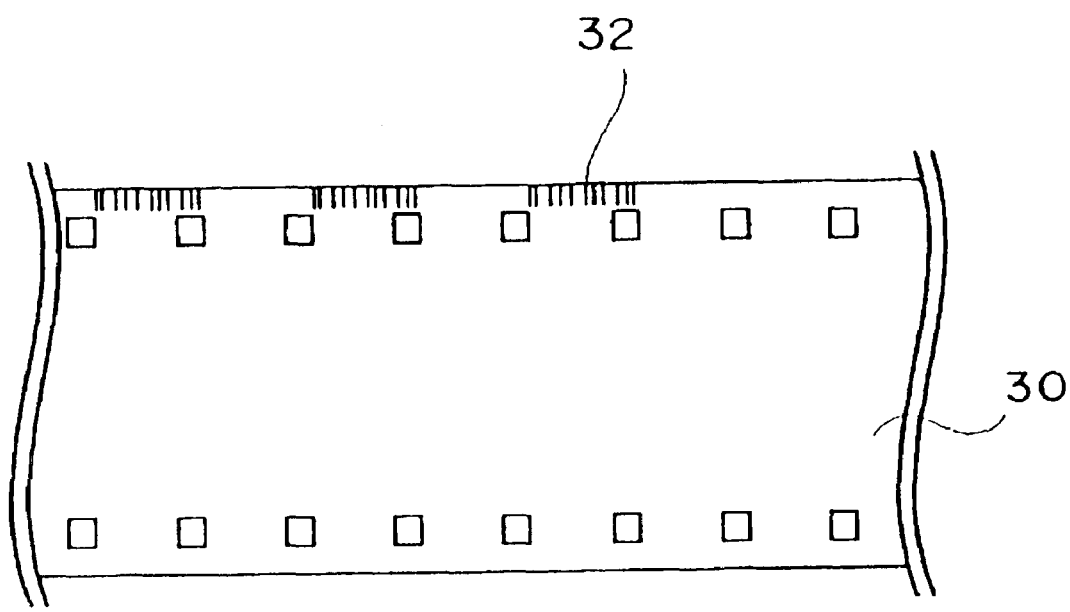
FIG. 9 is a view of a film according to the embodiment of the invention.

In FIG. 9, the new film 30 of a film system according to a fifth modified example of the embodiment of the invention is shown. Note that description of portions which are similar to those of the embodiment of the invention will be omitted.

As shown in FIG. 9, a bar code 32 serving as an identifier is printed on the edge portion of the new film 30, and the film is recognized as the new film 30 by reading by a bar code reader of the camera serving as a detecting component.

Because the bar code 32 cannot be detected by a usual camera, the film is recognized as a film having the indicated sensitivity. Further, because the bar code 32 is not printed on a usual film, the film is recognized as a film having the indicated sensitivity.

In the present embodiment, the bar code 32 is printed on the edge portion of the film 30. However, the invention is not limited to this, and the bar code 32 may be printed on a place other than the edge.

Figure 10:
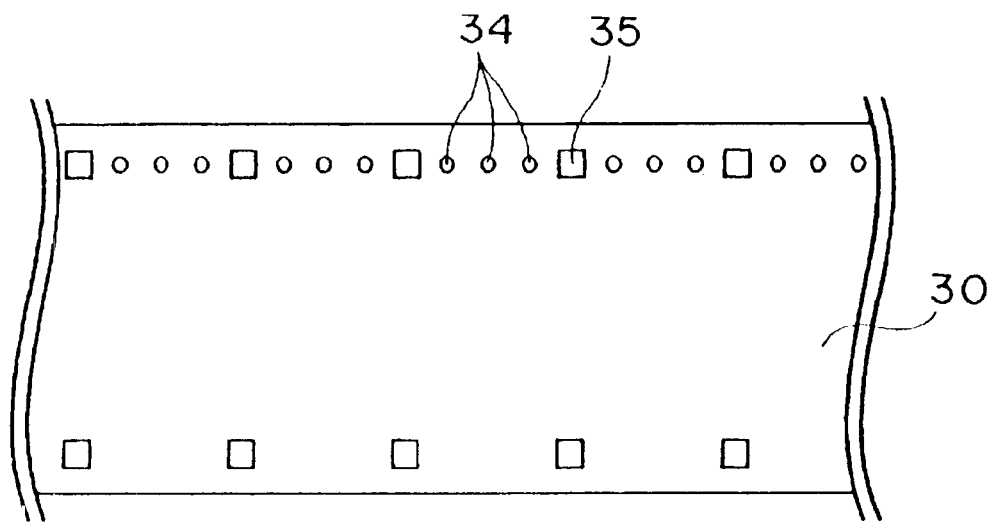
FIG. 10 is a view of the film according to the embodiment of the invention.

In FIG. 10, the new film 30 of a film system according to a sixth modified example of the embodiment of the invention is shown. Note that description of portions which are similar to those of the embodiment of the invention will be omitted.

As shown in FIG. 10, holes 34 serving as identifiers are formed between perforations 35 of the new film 30. The film is recognized as the new film 30 by reading the holes 34 by an optical sensor of the camera serving as an identifier detecting component.

Because the holes 34 cannot be detected by a usual camera, the film is recognized as a film having the indicated sensitivity. Further, because the holes 34 do not exist between the perforations 35 in a usual film, the film is recognized as a film having the indicated sensitivity.

In the present embodiment, the holes 34 are formed between the perforations 35. However, the invention is not limited to this. For example, the holes 34 may be formed in places other than between the perforations 35. Alternatively, instead of forming the holes 34, one portion of the film may be cut off in a predetermined shape, or a layer of the film may be removed. That is, the identifiers may be notches at the film.

Figure 11:
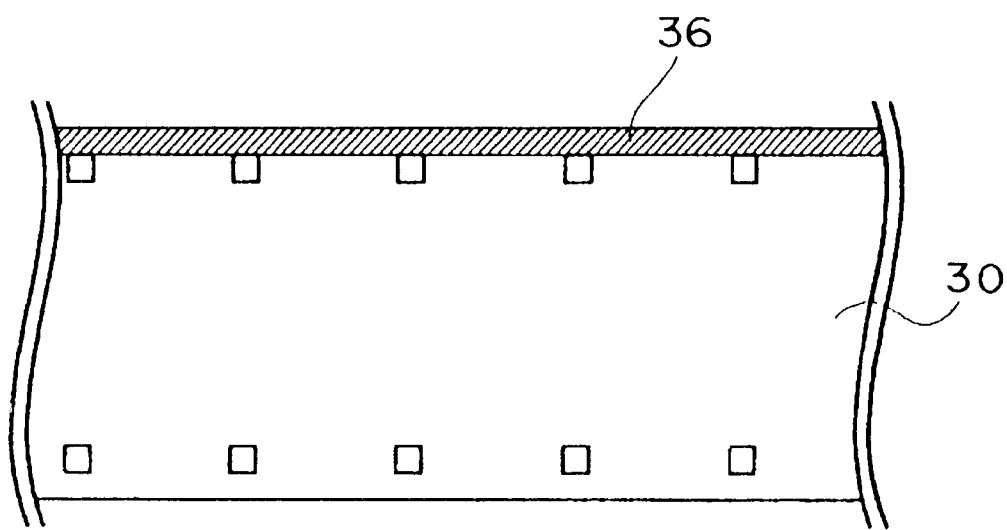
FIG. 11 is a view of the film according to the embodiment of the invention.

In FIG. 11, the new film 30 of a film system according to a seventh modified example of the embodiment of the invention is shown. Note that description of portions which are similar to those of the above-described embodiment of the invention will be omitted.

As shown in FIG. 11, a magnetic layer 36 which is a magnetic recording medium is formed at the edge of or on the entire face of the new film 30. The film is recognized as the new film 30 by the magnetic recorded information, which serves as the identifier and which was recorded in advance on the magnetic layer 36, being read by a magnetic sensor of the camera serving as an identifier detecting component.

Because the magnetic recorded information recorded on the magnetic layer 36 cannot be detected by a usual camera, the film is recognized as a film having the indicated sensitivity. Further, because the magnetic recorded information is not recorded on a usual film, the film is recognized as a film having the indicated sensitivity.

In the present embodiment, the film 30 has the magnetic layer 36 at the edge thereof or on the entire face thereof. However, the invention is not limited to this, and for example, the film 30 may have a magnetic recordable area at an arbitrary portion of the film.

Note that, in the above, description was given of a case in which the cartridge 10 used for the 35 mm film system 13 is used as the film accommodating body. However, the present embodiment is not limited to this. For example, the cartridge 201 used for the APS film system 200 shown in FIGS. 17A and 17B, the film pack 221 of the instant film system 220 shown in FIG. 17D, or the like may be used as the film accommodating body.

Further, in the above description, the 35 mm film 30 is used as the film. However, the present embodiment is not limited to this, and for example, the negative film 202 used for the APS film system 200 shown in FIGS. 17A through 17C, the film 222 of the instant film system 220 shown in FIG. 17D, or the like may be used.

In FIG. 12, a camera according to an eighth modified example of the embodiment of the invention is shown. Note that description of portions which are similar to those of the embodiment of the invention will be omitted.

As shown in FIG. 12, the cartridge 10 in which the new film is filled is loaded in a camera 40. Due to the camera reading an identifier provided at the cartridge 10 or the film, the camera is set to a mode in which the sensitivity is automatically switched in accordance with the photographing condition.

As an example, when using the cartridge 10 at which the additional code 22 serving as an identifier is recorded at a location other than the designated position of the CAS code 102 shown in FIG. 2, the electrical contact 42 electrically detecting the usual CAS code 102 serving as an indicated sensitivity identifier is provided, and the electrical contact 44 detecting the additional code 22 is provided at a location corresponding to the position of the additional code 22.

The above-described recording component and identifier detecting component corresponding to the identifier which is used may be provided at the camera in accordance with the position of the identifier.

In accordance therewith, a usual film and a new film are distinguished and displayed on the display element 160 of the camera 40. The following can be considered as display methods: a method of distinguishing by outline characters (usual film) and black characters (new film), a method in which the display of the film sensitivity flickers in the case of the new film, a method in which the ISO sensitivity numeric value portion is underlined, a method in which the ISO sensitivity numeric value portion is framed, or an interruption-display method in which, for example, "800" and "1600" are alternately displayed, or the like.

Figure 13A:
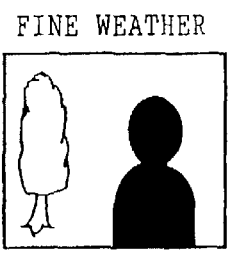
FIG. 13A to FIG. 13C are explanatory views of photographing methods according to the embodiment of the invention.
Figure 13B:
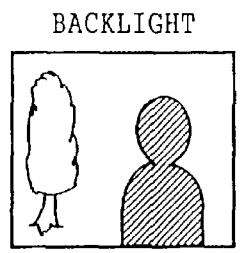
Figure 13C:

Accordingly, as shown in FIGS. 13A through 13C, due to the camera 40 identifying the new film and using the new film by automatically switching the sensitivity in accordance with the photographing condition such as the luminance of the object or the like, photographing is carried out with the same film by sensitivity settings of the camera which differ in accordance with the situations such as the luminance of the object, the presence/absence of an electronic flash, the time, and the like. Exposure control slight overexposure or slight underexposure is carried out.

FIG. 13A expresses fine weather and open-air in the daytime, FIG. 13B expresses backlighting, and FIG. 13C expresses night views/dark interior. The black solid portions express slight overexposure, and the outlined white portions express slight underexposure, and the hatched portions express appropriate density.

As an example, a case will be described in which a new film which can be used at two sensitivities of ISO 800 and ISO 1600 is used by switching the sensitivity setting of the camera between ISO 800 which is the indicated sensitivity and ISO 1600 which is a sensitivity different from the indicated sensitivity.

As shown in FIG. 13A, in a case of photographing under fine weather and in open-air, when the image quality deteriorates due to over-latitude of the negative film if the film is controlled at ISO 800, the film is controlled to be exposed at ISO 1600.

By making the quantity of light incident on the film to be small, a photographic print having good tone can be obtained.

As shown in FIG. 13B, at a brightness at which exceeding the over-latitude does not occur at ISO 800, the film is controlled to be exposed as ISO 800. Therefore, a case in which a face of a person is exposed so as to be slightly underexposed in photographing under backlight can be covered, and a print having high saturation can be made. Further, a print having no problems at all can be obtained in photographing under in front-light.

In photographing in a dark place at which the brightness is lower than the AE interlocking range as shown in FIG. 13C, it is suitable for the film to be controlled at ISO 1600. If the film is controlled at ISO 800, the quantity of light of the electronic flash on a main object is stronger than that at ISO 1600, and background representation deteriorates because the difference between the exposure amount in this case and the exposure amount in outdoor light is large.

Note that, in the above description, for simplifying the explanation, it has been described that the sensitivity setting of the camera is automatically switched to the two ways of ISO 800 which is the indicated sensitivity and ISO 1600 which is a sensitivity different from the indicated sensitivity. However, the invention is not limited to this, and for example, the sensitivity setting of the camera may be switched to any sensitivity between the indicated sensitivity and the sensitivity different from the indicated sensitivity. Further, on the basis of the information that the film can be used in photographing by setting the sensitivity to a sensitivity different from the indicated sensitivity, which information is displayed on the display element 160, the photographer may manually switch the sensitivity setting of the camera to either of the indicated sensitivity and the sensitivity different from the indicated sensitivity.

Note that, in the above-described embodiment, a silver salt camera was used as the photographing device and the film was used as the light-responsive component. However, the invention is not limited to this, and for example, a digital camera may be used as the photographing device and an image pickup element such as a CCD or the like may be used as the light-responsive component.

Further, in the above-described embodiment, the photographing device has been described in which the first identifier detecting component, which detects the identifier, and the second identifier detecting component, which detects the indicated sensitivity identifier showing the indicated sensitivity, are separately provided. However, the invention is not limited to this, and for example, the first identifier detecting component and the second identifier detecting component may be structured as one identifier detecting component. In this case, the identifier and the indicated sensitivity identifier can be recorded at the same position in the same way, and can be distinguished in accordance with information contained therein.

As described above, the photographing device of the invention is characterized by having an identifier detecting component which detects an identifier showing that a light-responsive component, which responds to light from an object, can be used in photographing by setting the sensitivity of the light-responsive component to a sensitivity different from the indicated sensitivity. As an example, the camera 40 has the electrical contact 44 serving as an identifier detecting component or a first detecting component which detects the additional code 22 serving as an identifier. This makes it possible to identify whether or not the film can be used in photographing by setting the sensitivity to a sensitivity different from the indicated sensitivity, in order to inform the user of the sensitivity of the light-responsive component.

What is claimed is:

1. A photographing device comprising:
    an identifier detecting component which detects an identifier showing that a light-responsive component responsive to light from an object can be used in photographing with a sensitivity different from an indicated sensitivity being set as a sensitivity of the light-responsive component.

2. The photographing device of claim 1, wherein the identifier detecting component comprises a first identifier detecting component which detects the identifier, and a second identifier detecting component which detects an indicated sensitivity identifier showing the indicated sensitivity.

3. The photographing device of claim 1, further comprising:
    a luminance detecting component which detects a luminance of the object;
    a sensitivity setting component which sets a sensitivity on the basis of the luminance of the object detected by the luminance detecting component and the identifier detected by the identifier detecting component; and
    a photographing component which photographs the object on the basis of the sensitivity set by the sensitivity setting component.

4. The photographing device of claim 1, wherein the light-responsive component has the identifier.

5. The photographing device of claim 3, wherein
    the light-responsive component is formed so as to be able to record sensitivity information showing a sensitivity at a time of photographing the object, and
    the light-responsive component further has a recording component that records sensitivity information showing the sensitivity set by the sensitivity setting component.

6. The photographing device of claim 1, wherein
    the photographing device can load therein an accommodating body which accommodates the light-responsive component, and
    the accommodating body has the identifier.

7. The photographing device of claim 3, wherein
    the photographing device can load therein an accommodating body which accommodates the light-responsive component,
    the accommodating body is formed so as to be able to record sensitivity information showing a sensitivity at a time of photographing the object, and
    the accommodating body further has a recording component which records sensitivity information showing the sensitivity set by the sensitivity setting component.

8. The photographing device of claim 7, wherein the accommodating body has the identifier.

9. The photographing device of claim 7, wherein the light-responsive component has the identifier.

10. The photographing device of claim 8, wherein
    the accommodating body has an indicated sensitivity identifier showing the indicated sensitivity, and
    the identifier detecting component is structured so as to be able to detect the indicated sensitivity identifier.

11. The photographing device of claim 9, wherein
    the accommodating body has an indicated sensitivity identifier showing the indicated sensitivity, and
    the identifier detecting component is structured so as to be able to detect the indicated sensitivity identifier.

12. The photographing device of claim 8, wherein the light-responsive component has an indicated sensitivity identifier showing the indicated sensitivity, and the identifier detecting component is structured so as to be able to detect the indicated sensitivity identifier.

13. The photographing device of claim 9, wherein the light-responsive component has an indicated sensitivity identifier showing the indicated sensitivity, and the identifier detecting component is structured so as to be able to detect the indicated sensitivity identifier.

14. The photographing device of claim 10, wherein the identifier detecting component comprises a first identifier detecting component which detects the identifier, and a second identifier detecting component which detects the indicated sensitivity identifier.

15. The photographing device of claim 11, wherein the identifier detecting component comprises a first identifier detecting component which detects the identifier, and a second identifier detecting component which detects the indicated sensitivity identifier.

16. The photographing device of claim 12, wherein the identifier detecting component comprises a first identifier detecting component which detects the identifier, and a second identifier detecting component which detects the indicated sensitivity identifier.

17. The photographing device of claim 13, wherein the identifier detecting component comprises a first identifier detecting component which detects the identifier, and a second identifier detecting component which detects the indicated sensitivity identifier.

18. The photographing device of claim 3, wherein
    a sensitivity characteristic of the light-responsive component has a first region having a first characteristic that approximates a sensitivity characteristic of a light-responsive component having the different sensitivity, and a second region having a second characteristic that approximates a sensitivity characteristic of a light-responsive component having the indicated sensitivity, and
    the sensitivity setting component sets the sensitivity to one of the different sensitivity and the indicated sensitivity on the basis of the luminance of the object detected by the luminance detecting component.

19. The photographing device of claim 18, wherein
    the light-responsive component is a film,
    the first region is a region in which an amount of exposure with respect to the film is less than a predetermined value,
    the second region is a region in which the exposure amount is larger than the predetermined value,
    the indicated sensitivity is ISO 800, and
    the different sensitivity is ISO 1600.

20. The photographing device of claim 1, wherein the light-responsive component is an image pickup element which picks up the object.

21. A film accommodating body capable of accommodating therein a film which can be used in photographing with a sensitivity of the film set to a sensitivity different from an indicated sensitivity, wherein an identifier which identifies that the film can be used in photographing with the sensitivity of the film set to a sensitivity different from the indicated sensitivity, is provided.

22. The film accommodating body of claim 21, wherein the identifier is a CAS code in which one portion of or all of a continuity surface has a same color as a non-continuity surface, and is detected as different information by electrical detection and optical detection.

23. The film accommodating body of claim 21, wherein the identifier is a CAS code recorded at a location other than a designated position.

24. The film accommodating body of claim 21, wherein the identifier is a CAS code recorded at gaps between CAS code patterns.

25. The film accommodating body of claim 21, wherein a radio wave sensing IC is provided at the film accommodating body, and the radio wave sensing IC includes the identifier.

26. The film accommodating body of claim 21, wherein the identifier is a bar code printed at the film accommodating body.

27. The film accommodating body of claim 21, wherein the film accommodating body has a predetermined shape as the identifier.

28. The film accommodating body of claim 21, wherein a sensitivity characteristic of the film has a first region having a first characteristic that approximates a sensitivity characteristic of a film having the different sensitivity, and a second region having a second characteristic that approximates a sensitivity characteristic of a light-responsive component having the indicated sensitivity.

29. The film accommodating body of claim 21, wherein the film accommodating body is formed so as to be able to record sensitivity information showing sensitivity at a time of photographing an object.

30. A film system comprising:
    a film which can be used in photographing with a sensitivity of the film set to a sensitivity different from an indicated sensitivity; and
    a film accommodating body having the film accommodated therein,
    wherein an identifier which identifies that the film can be used in photographing with the sensitivity of the film set to a sensitivity different from the indicated sensitivity, is provided at at least one of the film and the film accommodating body.

31. The film system of claim 30, wherein the identifier is a CAS code in which one portion of or all of a continuity surface has a same color as a non-continuity surface, and is detected as different information by electrical detection and optical detection.

32. The film system of claim 30, wherein the identifier is a CAS code recorded at a location other than a designated position.

33. The film system of claim 30, wherein the identifier is a CAS code recorded at gaps between CAS patterns.

34. The film system of claim 30, wherein a radio wave sensing IC is provided at the film accommodating body, and the radio wave sensing IC includes the identifier.

35. The film system of claim 30, wherein the identifier is a bar code printed at the film.

36. The film system of claim 30, wherein the identifier is a notch in the film.

37. The film system of claim 30, wherein there is a magnetic recordable region at the film, and the identifier is information recorded on the magnetic recordable region.

38. The film system of claim 30, wherein the film accommodating body has a predetermined shape as the identifier.

39. The film system of claim 30, wherein a sensitivity characteristic of the film has a first region having a first characteristic that approximates a sensitivity characteristic of a film having the different sensitivity, and a second region having a second characteristic that approximates a sensitivity characteristic of a light-responsive component having the indicated sensitivity.

40. The film system of claim 30, wherein at least one of the film and the film accommodating body is formed so as to be able to record sensitivity information showing sensitivity at a time of photographing an object.

41. A photo lab apparatus that reads the sensitivity information recorded at the film accommodating body of claim 29, and processes images on the basis of the sensitivity information.

42. A photo lab apparatus that reads images and the sensitivity information recorded at the film system of claim 40, and processes the images on the basis of the sensitivity information.

43. A photographing method for detecting an identifier showing that a light-responsive component responsive to light from an object can be used in photographing with a sensitivity set to a sensitivity different from an indicated sensitivity being set as a sensitivity of the light-responsive component.

44. A photographing method comprising the steps of:
    determining whether or not a film, on which an object is photographed and an image is recorded, can be used in photographing with a sensitivity of the film set to a sensitivity different from an indicated sensitivity;
    detecting a luminance of the object; and
    setting the sensitivity on the basis of the detected luminance of the object when it is determined that the film can be used in photographing with the sensitivity of the film set to a sensitivity different from the indicated sensitivity.

45. The photographing method of claim 44, further comprising the step of recording the sensitivity which was set.

46. An image processing method comprising the steps of:
    reading the sensitivity recorded according to the photographing method of claim 45; and
    processing images recorded on the film on the basis of the read sensitivity.

* * * * *